United States Patent
Murata et al.

(10) Patent No.: US 11,754,124 B2
(45) Date of Patent: Sep. 12, 2023

(54) TORSIONAL VIBRATION REDUCTION APPARATUS

(71) Applicant: UNIPRES CORPORATION, Yokohama (JP)

(72) Inventors: Yutaka Murata, Fuji (JP); Atsushi Kobayashi, Fuji (JP)

(73) Assignee: UNIPRES CORPORATION, Yokohama (JP)

( * ) Notice: Subject to any disclaimer, the term of this patent is extended or adjusted under 35 U.S.C. 154(b) by 494 days.

(21) Appl. No.: 16/960,637

(22) PCT Filed: Feb. 19, 2019

(86) PCT No.: PCT/JP2019/006093
§ 371 (c)(1),
(2) Date: Jul. 8, 2020

(87) PCT Pub. No.: WO2019/163770
PCT Pub. Date: Aug. 29, 2019

(65) Prior Publication Data
US 2020/0386275 A1 Dec. 10, 2020

(30) Foreign Application Priority Data
Feb. 20, 2018 (JP) ................... 2018-027786

(51) Int. Cl.
*F16D 3/12* (2006.01)
*F16F 15/134* (2006.01)
*F16H 45/02* (2006.01)

(52) U.S. Cl.
CPC .............. *F16D 3/12* (2013.01); *F16F 15/134* (2013.01); *F16H 45/02* (2013.01); *F16H 2045/0221* (2013.01)

(58) Field of Classification Search
CPC .......... F16D 3/12; F16F 15/134; F16H 45/02; F16H 2045/0221
(Continued)

(56) References Cited

U.S. PATENT DOCUMENTS 4,789,375 A 12/1988 Bassett
6,216,838 B1 * 4/2001 Bacher .............. F16F 15/12313

FOREIGN PATENT DOCUMENTS

GB 2189307 A 10/1987
JP S55-7482 U 1/1980
(Continued)

OTHER PUBLICATIONS

International Search Report with English translation and Written Opinion issued in corresponding application No. PCT/JP2019/006093 dated Apr. 2, 2019.

*Primary Examiner* — Greg Binda
(74) *Attorney, Agent, or Firm* — Foley & Lardner LLP

(57) ABSTRACT

A torsional vibration reduction apparatus has coil springs. The coil springs are received in paired input member side coil spring receiving portions and an output member side coil spring receiving portion. The paired input member side coil spring receiving portions comprise forward rotation side and reverse rotation side guide portions between forward rotation side and reverse rotation side spring pedestals. The output member side coil spring receiving portion comprises forward rotation side and reverse rotation side guide portions between forward rotation side and reverse rotation side spring pedestals. In forward rotation and reverse rotation, since the displacement of the coil springs under the centrifugal force is received by the guide portions and the vertical component force of the elastic force is small, sliding resistance is suppressed, the hysteresis torque is reduced,
(Continued)

additive components are not required, and the installation positions of the coil springs cannot be restricted.

7 Claims, 12 Drawing Sheets

(58) Field of Classification Search
USPC .............................. 464/68.1, 68.92; 192/205
See application file for complete search history.

(56) References Cited

FOREIGN PATENT DOCUMENTS

| | | |
|---|---|---|
| JP | S59-151625 A | 8/1984 |
| JP | S63-115649 U | 7/1988 |
| JP | S63-163033 A | 7/1988 |
| JP | H09-100875 A | 4/1997 |
| JP | 2006-316963 A | 11/2006 |
| JP | 5670676 B2 | 2/2015 |
| JP | 5835391 B2 | 12/2015 |

\* cited by examiner

REVERSE ROTATION ←→ FORWARD ROTATION

FIG.9A
FIG.9B
PRESENT INVENTION
PRIOR ART
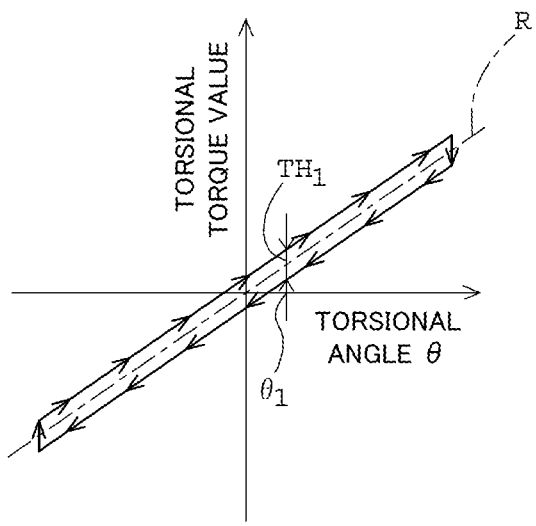
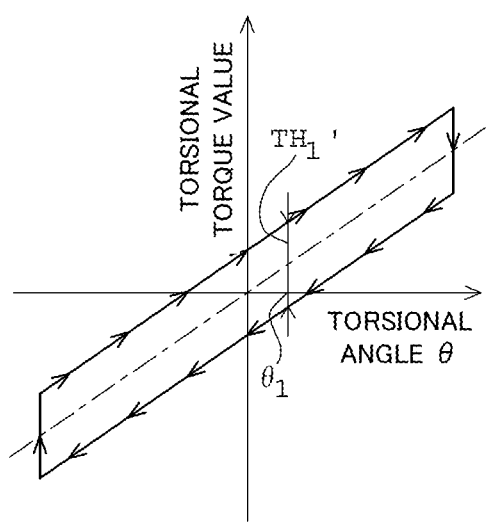

FIRST PRIOR ART

SECOND PRIOR ART

THIRD PRIOR ART

TORSIONAL VIBRATION REDUCTION APPARATUS

TECHNICAL FIELD

The present invention relates to a torsional vibration reduction apparatus using coil springs as an elastic body, in particular to the torsional vibration reduction apparatus which can preferably be used for a noise reduction in a specific frequency region when a lock up clutch is operated in a vehicle transmission including a torque converter.

Definition

In the present description, forward rotation and reverse rotation are terminologies which indicate a rotation (swing) direction in the torsional vibration which is occurred in a rotation driving source such as a crank axis. The forward rotation indicates the rotation (the swing) which is the same direction as the rotation driving source, and the reverse rotation indicates the rotation (the swing) which is the opposite direction to the rotation driving source.

BACKGROUND ART

Generally, in a vehicle transmission including a torque converter, a torsional vibration reduction apparatus is disposed between a crank axis and a transmission input axis for absorbing torque (torsional torque) fluctuation or the like due to lock up clutch engagement during direct driving. It is known that the torsional vibration reduction apparatus which comprises an input member in an output side of an internal combustion engine, an output member in the transmission side and plural coil springs disposed between the input member and the output member at intervals in a circumferential direction. The input member comprises plural coil spring housing formed an input spring receiving portions are opposite in the circumferential direction each other for holding the coil springs at intervals in the circumferential. The output member also comprises plural coil spring housing formed an output spring receiving portions are opposite in the circumferential direction each other, and the output coil spring receiving portions are paired with the corresponding input coil spring receiving portions in an axial direction. The coil springs are received in the paired input and output coil spring receiving portions. The torsional vibration between the input member and the output member occurs elastic deformation of the coil springs depending on the magnitude of a torsional amplification between the input and output spring pedestals which are opposite in the circumferential direction in the input and output spring receiving portions. Thereby, the torsional vibration can be reduced.

In the torsional vibration, the forward rotation that the input member swings to the output member in a same direction as the crank axis rotation and the reverse rotation that the input member swings to the output member in an opposite direction to the crank axis rotation are repeated. In the operation of the torsional vibration reduction apparatus, the elastic deformation of the coil springs between the output member forward rotation side spring pedestals and the input member forward rotation side spring pedestals is occurred during the forward rotation. The elastic deformation of the coil springs between the output member reverse rotation side spring pedestals and the input member reverse rotation side spring pedestals is occurred during the reverse rotation. Since an unavoidable delay to the following-up of the elastic deformation of the coil springs against the rotation displacement (the torsional angle) by the input and output members during the torsional vibration is occurred, an ideal damping characteristic that the torque value is uniquely determined to the torsional angle cannot be obtained. At the same torsional angle, the torque value during the torque increasing is different from the torque value during the torque value decreasing. That is, hysteresis is occurred. Such a hysteresis (hereinafter, the magnitude of the hysteresis at the torsional angle is referred to as a hysteresis torque) can badly be affected to a predetermined damping operation in a case that the hysteresis torque is large. In the vehicle transmission, it is necessary that a torsional damper is operated under the high rotational number, and centrifugal force which is applied to the coil springs can be affected to the hysteresis characteristic. That is, under the circumstance that the input and output members rotate with high speed, centrifugal force displaces the coil springs in a radial outward direction. In a case that lateral rigidity of the coil springs endures the large centrifugal force, the coil springs are abutted to or are slid to the inner circumferential surface of the input and output coil spring receiving portions in the coil spring end portions where the displacement in a radial direction is maximized. In a case that the lateral rigidity of the coil springs does not endure the large centrifugal force, the coil springs are deflected or are buckled to the radial outward direction. Because the coil springs are slid to the inner circumferential surface at the portions where the vertical component force by the coil spring displacement is large, the hysteresis torque value further increases. This leads to largely reduce the torsional vibration reduction function by the torsional damper.

As the hysteresis countermeasure technique, it is proposed that the radial outward movement in the coil spring end portions or the spring sheets disposed at the coil spring end portions is suppressed, and then the radial direction movement of the coil spring end portions by the centrifugal force is prevented (Patent Document 1). As another hysteresis countermeasure technique, the coil springs are disposed in the inner circumferential side of the annular members, and the annular members are rotated depending on the deformation of the coil springs, regardless of the relative displacement between the input and output members by the deformation of the coil springs (Patent Document 2). Related to embodiments of the present invention, with reference to the multi-plate type lock up clutch including a piston that moves to the front cover on the guide member (the pilot) welded at the front cover, the similar configuration is disclosed in Patent Document 3.

THE LIST OF PRIOR ART DOCUMENTS

Patent Documents

Patent Document 1: Japanese Unexamined Patent Publication No. 2006-316963 A
Patent Document 2: Japanese Patent No. 5670676 B2
Patent Document 3: Japanese Patent No. 5835391 B2

SUMMARY OF THE INVENTION

Problems to be Solved by the Invention

In Patent Document 1, the radial outward movement in the coil spring end portions is controlled and is suppressed, and then the coil springs are prevented from abutting to or sliding to the inner circumferential surface of the coil spring receiving portions of the input and output members in the coil spring end portions where the radial outward displacement is maximized when the relative movement between the input member and the output member is occurred. In a case that the lateral rigidity overcomes the centrifugal force at the intermediate portions where the radial outward movement is not suppressed (in a case that the total length of the coil springs is short, or a wire diameter or a coil diameter is large), the above slide preventing countermeasure is effective. However, in a case that the coil springs having the small coil diameter and the some length have to dispose at the portions where the large centrifugal force is received, because of considering the layout, the coil springs abut to or slide to the inner circumferential surface of the input and output coil spring receiving portions due to the radial outward displacement under the centrifugal force, and there is a problem that the hysteresis torque becomes larger. An increase in the hysteresis torque is badly affected to the damping function and causes the noise (a booming noise or the like) by the vehicle body vibration. According to general understanding, this is caused by insufficiently suppressing the transmission rate of the rotation fluctuation in the rotation region where the human strongly feels uncomfortable feeling in the rotation speed which is slightly higher than the torsional resonance point in the power train from the crank axis to the vehicle wheels. Recently, it is desired that more sufficient damping operation can be obtained in a circumstance that the lock up mechanism is operated from the low rotation region because of the recent request of improving the fuel consumption efficiency.

In a case that the coil springs in Patent Document 2 are disposed in the inner circumference of the rotatable annular member regardless of the relative displacement between the input member and the output member, theoretically, the hysteresis torque value decreases the half of the conventional value. However, the annular member which is an additive component is needed, and the annular member causes an increase in the cost. Functionally, it is required that the annular member rotates depending on the deformation of the coil springs. In order that the coil springs ensure the uniform contact to the inner circumference of the annular member along the total length of the coil springs, it is necessary that the spring length is short and the lateral rigidity is low. In a case that the length of the coil springs is long, it is difficult that the coil springs are uniformly in contact with the inner surface of the annular member, and the concern that the expected performance cannot be obtained is occurred since the smooth rotation in the annular member in response to the deformation of the coil springs cannot be obtained. Further, it is preferred that the annual member have a light weight. The strength reduction due to weight saving causes the concern that the abnormality in the expansion-contraction operation of the coil springs due to the deformation, and the deformation or the breakage of the annular member is occurred.

The present invention has been developed in view of the above-described problems of the prior art, and an object of the present invention is to provide the torsional vibration reduction apparatus which obtains the expected torsional vibration reduction performance by reducing the hysteresis torque caused by the sliding of the coil springs under the centrifugal force without restricting the layout and requiring the additive components.

Means for Solving the Problems

The present invention relates to a torsional vibration reduction apparatus the above-described object of the present invention is achieved by that comprising: an input member of a rotation driving source side; an output member of a driven body side; input member side spring receiving portions which are plurally disposed on the input member at intervals in a circumferential direction, each including a spring pedestal opposite to the circumferential direction each other; output member side spring receiving portions which are plurally disposed on the output member at intervals in the circumferential direction and are paired with the respective input member side spring receiving portions opposite to an axial direction, each including a spring pedestal opposite to the circumferential direction each other; and coil springs which are disposed between respective pairs of the input member side spring receiving portions and the output member side spring receiving portions which are opposite to the axial direction, wherein, with respect to a rotation displacement that rotation of the output member to that of the input member is same as rotational direction of the rotation driving source (forward rotation), elastic deformation of the coil springs between the forward rotation side spring pedestals of the output member and the forward rotation side spring pedestals of the input member is occurred; wherein, with respect to a rotation displacement that the rotation of the output member to that of the input member is opposite to the rotational direction of the rotation driving source (reverse rotation), elastic deformation of the coil springs between the reverse rotation side spring pedestals of the output member and the reverse rotation side spring pedestals of the input member is occurred; wherein the rotation displacement is reduced by the elastic deformation of the coil springs; and wherein respective pairs of the input member side spring receiving portions and the output member side spring receiving portions comprise a pair of guide portions to permit a local contact to the respective coil springs between circumferential direction center portions of the input member side and the output member side in an inner circumferential surface opposite to an outer circumference of the coil spring and the spring pedestals of the input member side and the output member side for slidably guiding coil spring outer circumferential portions when occurring the elastic deformation of the coil springs under centrifugal force. Here, the forward rotation side and the reverse rotation side of the spring pedestals will be described as follows. Regardless of the forward rotation and the reverse rotation in the rotation fluctuation, when the torsional vibration in the forward rotational direction is occurred, the spring pedestals which are related to the operation which suppresses the torsional vibration are defined as the forward rotation side spring pedestals. When the torsional vibration in the reverse rotational direction is occurred, the spring pedestals which are related to the operation which suppresses the torsional vibration are defined as the reverse rotation side spring pedestals. In the guide portions as described below, when the function serves for the forward rotation, their guide portions are defined as the forward rotation side guide portions, regardless of the forward rotation and the reverse rotation in the rotation fluctuation. When the function serves for the reverse rotation, their guide portions are defined as the reverse rotation side guide portions.

Preferably, in respective pairs of the input member side spring receiving portions and the output member side spring receiving portions, a pair of the guide portions in one of the input member side spring receiving portion and the output member side spring receiving portion make protrusion heights to radial inward set to high, a pair of the guide portions in the other of the input member side spring receiving portion and the output member side spring receiving portion make protrusion heights to radial inward set to low, in one of the rotation displacement, sliding guide to the centrifugal force in respective pairs of the input member side spring receiving portions and the output member side spring receiving portions is performed by the input member side spring receiving portions and the output member side spring receiving portions whose protrusion heights are high, and in the other of the rotation displacement, sliding guide to the centrifugal force in respective pairs of the input member side spring receiving portions and the output member side spring receiving portions is performed by the input member side spring receiving portions and the output member side spring receiving portions whose protrusion heights are low. When the torsional fluctuation is occurring, the opposed coil spring end portions are permitted the freely sliding to a radial direction where the spring pedestals in both ends. It is preferable that the sliding of the coil springs under the centrifugal force is performed by only one pair of the guide portions.

It is preferable that, in a pair of the guide portions in respective pairs of the input member side spring receiving portions and the output member side spring receiving portions, the guide portion whose protrusion height to radial inward is high has an inclined surface whose protrusion height smoothly decreases toward the center portion in the circumferential direction of the corresponding spring receiving portions. It is also preferable that, in respective pairs of the input member side spring receiving portions and the output member side spring receiving portions, the guide portions whose protrusion height to radial inward is high are the forward rotation side guide portions of the input member side and the forward rotation side guide portions of the output member side, and the guide portions whose protrusion height to radial inward is low are the reverse rotation side guide portions of the input member side and the reverse rotation side portions of the output member side.

The input member comprises a pair of annular plate members which are integrally coupled, the output member is sandwiched between the paired annular plate members, each the input member side spring receiving portions is aligned to and is opposite to the paired annular plate members in the axial direction, and is configured as a pair of formed portions having a protruding portion which is extended to an opposite direction, and the opposite end portions aligned to the axial portion in the circumferential direction of window-shape openings which are formed on the general surface in respective pairs of the formed portions and are aligned to the axial direction constitute the spring pedestals of the input member. In such a configuration, it is preferable that the guide portions in the respective paired annular plate members have an inner circumferential surface shape having gradient along a curved surface of the coil spring outer diameter in a traverse surface of a diameter surface.

Effects of the Invention

In both the forward rotation and the reverse rotation, the displacement of the coil springs to radial outward due to the centrifugal force is received on a pair of the guide portions. Since the slide due to the deformation of the coil springs is occurred in the portions where the vertical component force of the coil spring deformation load for reducing the radial direction displacement is small, the sliding resistance is relatively suppressed and the expected effect to reduce the torsional vibration can be obtained. In the vehicle including the torque converter, the above configuration effectively reduces the uncomfortable noise such as the booming noise which may cause a problem in a case that the lock up operation is performed from the low rotation region for improving the fuel consumption efficiency.

When the rotation changes between the forward rotation and the reverse rotation, the height of the guide portions to radial inward is changed. The receiving position of the coil spring displacement under the centrifugal force is the forward rotation side guide of the output member and the forward rotation side guide of the input member when the forward rotation. This receiving position when the reverse rotation is the reverse rotation side guide of the output member and the reverse rotation side guide of the input member. Therefore, the distinction between the forward rotation and the reverse rotation has surely been done. Since the guides for the forward rotation and the guides for the reverse rotation do not slide at the same time, an increase in the sliding resistance can be prevented. Because the guide portions whose protrusion height in the circumferential direction center side is high and which has an inclined surface whose protrusion height gradually decreases are used, the smooth switch from the torsional fluctuation guide portions of low height to torsional fluctuation guide portions of the high height is possible. Since the torsional vibration is mainly occurred in the forward rotational direction when the vehicle runs forwardly, it has an advantage to decrease the slightly bad affecting to the damping operation due to the displacement to radial outward which is unavoidably occurred in the coil springs when the rotation is switched from the forward rotation to the reverse rotation in which use the low-height guides by using the guide portions whose protrusion height to radial inward is high during the forward rotation side torsional vibration.

In a case that the output member is sandwiched between a pair of the annular plate members in the input member and the paired annular plate members are integrally coupled, the guide portions of the input member side are opposite to the portions which are separated from the diameter surface in the coil springs. It has an effect that the deflection of the axial direction of the coil springs is suppressed by making the guide portions have the inclined inner circumferential surface shape along the curve surface of the outer diameter of the coil springs in the transverse surface of the diameter surface.

BRIEF DESCRIPTION OF THE DRAWINGS

In the accompanying drawings:

FIG. 8A shows a neutral state (a setting state), FIG. 8B shows a forward rotation state and FIG. 8C shows a reverse rotation state;

FIGS. 9A and 9B are a graph schematically showing a torsional torque characteristic to the torsional angle, FIG. 9A shows the torsional torque characteristic of the present invention, and FIG. 9B shows the torsional torque characteristic of the torsional damper of the prior art which does not have a countermeasure to the radial direction displacement of the coil spring under centrifugal force;

FIG. 10A shows a neutral state (a setting state), FIG. 10B shows a case that lateral rigidity of the coil spring is larger than the centrifugal force applied to the coil spring, and FIG. 10C shows a case that the lateral rigidity of the coil spring is smaller than the centrifugal force applied to the coil spring;

FIG. 11A shows the prior art which does not have a countermeasure to the radial direction displacement of the coil spring of FIGS. 10A, 10B and 10C, and FIG. 11B shows the present invention;

FIGS. 12A and 12B show a case of (I) that the lateral rigidity of the coil spring is larger than the centrifugal force, and FIGS. 12C and 12D show a case of (II) that the lateral rigidity of the coil spring is smaller than the centrifugal force;

MODE FOR CARRYING OUT THE INVENTION

Figure 1:
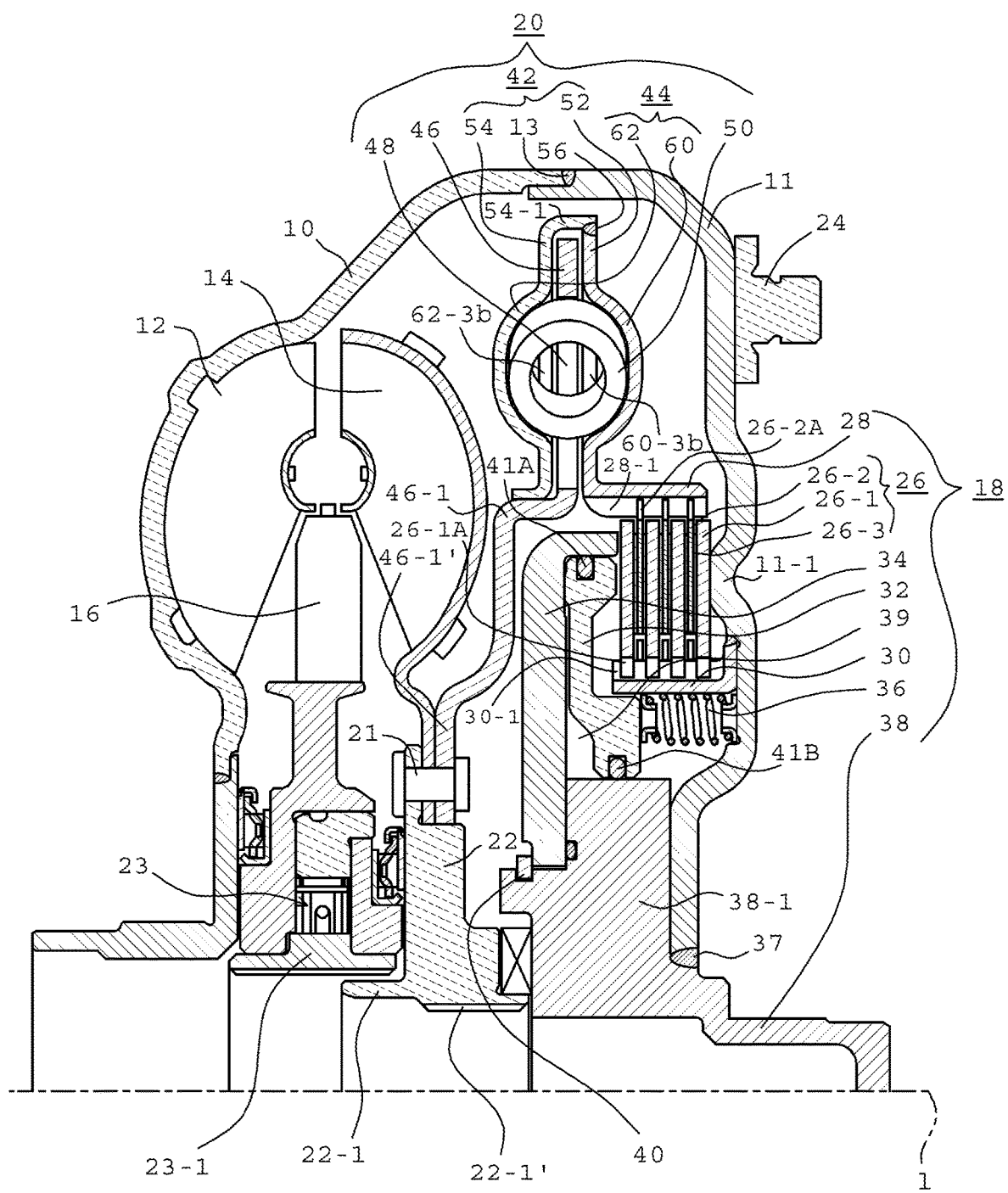
FIG. 1 is a cross-sectional view showing only a coaxial line part of a torque converter including a torsional vibration reduction apparatus (a torsional damper) of the present invention along an axial line of a torque converter.

FIG. 1 shows a cross-section of a torque converter along a central axis line "1". A front cover 11 is fixed to an impeller shell 10 by welding (the reference numeral 13 denotes a welded portion). A pump impeller 12, a turbine liner 14 and a stator 16 are basic components of the torque converter. The pump impeller 12, the turbine liner 14, the stator 16, a lock up clutch 18 and a torsional vibration reduction apparatus 20 of the embodiment according to the present invention (hereinafter, referred to as "a torsional damper") are received in a space closed by the impeller shell 10 and the front cover 11. The turbine liner 14 is fixed to a hub 22 by rivets 21 in an inner circumferential portion. An input axis of a transmission (not shown) is spline-fitted to a center spline bore 22-1' of a boss portion 22-1 of the hub 22. A well-known one-way clutch 23 for rotatably supporting the stator 16 in one direction is spline-fitted to a stator shaft (not shown) in an inner race 23-1. A boss bolt 24 is welded to an outer surface of an engine body side of the front cover 11, and a driving plate (not shown) which is coupled to a crank axis (not shown) of an internal combustion engine is fixed to the boss bolt 24. Thereby, the impeller shell 10 integrally rotates with the crank axis of the engine.

In the present embodiment, the lock up clutch 18 is a multi-plate type as well as Patent Document 3, and comprises a clutch pack 26, an outer clutch drum 28, an inner clutch drum 30, an annular piston 32, an annular separator plate 34, plural return springs 36 disposed at intervals in a circumferential direction, a pilot 38 which has a cylindrical member whose front end is closed, and is integrated with the front cover 11 by a welded portion 37, and a hydraulic pressure chamber 39 formed among a piston 32, a separator plate 34 and the pilot 38. The clutch pack 26 comprises driving plates 26-1, driven plates 26-2, and clutch facings 26-3 fixed to both surfaces of the driven plate 26-2. The driven plates 26-2 comprise outer teeth 26-2A which are slidably meshed with the clutch drum 28 in the axial direction, and the driving plates 26-1 comprise inner teeth 26-1A which are slidably meshed with the outer circumferential groove 30-1 of the inner clutch drum 30 in the axial direction. The clutch facings 26-3 are sandwiched between the driving plates 26-1 and the driven plates 26-2, and the driving plates 26-1 and the driven plates 26-2 are alternately disposed in the axial direction. The driving plates 26-1 transmit a torque by pressing the driven plates 26-2 via the clutch facings 26-3. The pilot 38 which is abutted to and is fixed to the front cover 11 by welding comprises a flange portion 38-1, and the piston 32 is slidably guided in the axial direction on the outer circumferential surface of this flange portion 38-1. The separator plate 34 is positioned at the separated side to the front cover 11 in the flange portion 38-1 of the pilot 38, and is engaged to the pilot 38 by a snap ring 40. The piston 32 is oil-tightly slidable by a seal ring 41A to the separator plate 34 in the outer circumference and is oil-tightly slidable by a seal ring 41B to the pilot 38 in the inner circumference. The pilot 38 is shown in FIG. 1 because the pilot 38 is not directly related to the present invention. The pilot 38 includes a passage for introducing the clutch operation oil to the hydraulic pressure chamber 39 and a passage for circulating the torque converter oil which is also used as the clutch oil.

As well-known, the engagement of the lock up clutch 18 is performed when the rotational number of the crank axis is higher than a predetermined value. When the rotational number of the crank axis is lower than the predetermined value, the operation oil is not introduced into the hydraulic pressure chamber 39 and the release state of the lock up clutch 18 of FIG. 1 in which the piston 32 is abutted to the separator plate 34, can be realized. In this time, the rotation of the crank axis is transmitted to the pump impeller 12 via the front cover 11 and the impeller shell 10. By flowing the oil which is circulated to the pump impeller 12 via the turbine 14 and the stator 16 from the turbine 14, the rotation of the crank axis is transmitted to an input axis of a transmission (not shown) via the hub 22. That is, the rotation of the output axis of the internal combustion engine is transmitted to the transmission via the torque converter. In the present embodiment, the torsional dumper 20 is not related to the power transmission when the driving is performed by the torque converter. When the operation oil is introduced to the hydraulic pressure chamber 39, the piston 32 is moved to the rightward in FIG. 1 against a return spring 36, the clutch pack 26 is sandwiched and is fixed between the piston 32 and the pressure received portion 11-1 of the front cover 11 by the piston 32, the lock up clutch 18 becomes the engagement state that the driving plates 26-1 are engaged with the driven plates 26-2 via the clutch facings 26-3, and the rotation of the output axis of the internal combustion engine is transmitted to the input axis of the transmission (not shown) via the front cover 11, the lock up clutch 18, the torsional damper 20 and the hub 22. When the lock up clutch 18 is engaged, the torque converter is not related to the power transmission.

As described above, in the present embodiment, the torsional damper 20 is functioned when the lock up clutch 18 is engaged (direct driving). The configuration of the torsional damper 20 will be described as follows. The torsional damper 20 comprises paired input members 42, plural paired input member side spring receiving portions 44 (in the present embodiment, eight spring receiving portions) formed on the paired input members 42 at intervals in the circumferential direction, an output member 46, eight output member side spring receiving portions 48 which are formed on the output member 46 in the circumferential direction and are paired with the paired input member side spring receiving portions 44 opposite to the axial direction, and eight coil springs 50 which are received in the eight paired spring receiving portions 44 of the paired input members 42 and the eight spring receiving portions 48 of the output member 46, respectively. In the present invention, the paired input members 42 has an integrated structure that the output member 46 is sandwiched between the front plate 52 of the front cover 11 side and the rear plate 54 of the impeller shell 10 side (that is, a pair of the annular plate members of the present invention comprise the front plate 52 and the rear plate 54). Both the front plate 52 and the rear plate 54 are press formed products made of plate steel.

Figure 2:
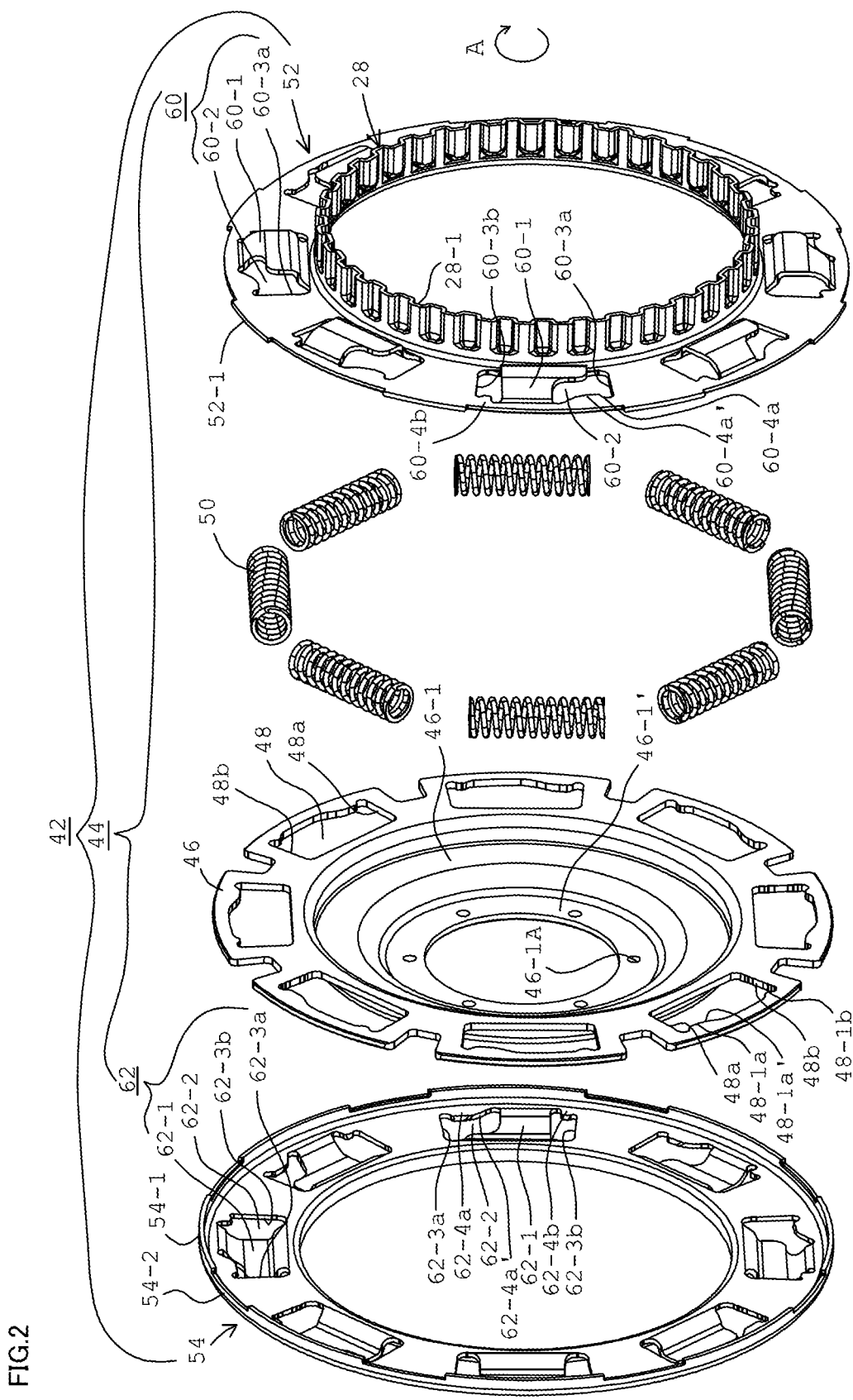
FIG. 2 is a perspective view from a crank axis side in a state that respective portions of the torsional damper of FIG. 1 are disassembled.

FIG. 2 is a perspective view from the engine side (the crank axis side) in a state that respective portions of the torsional damper 20 of FIG. 1 are disassembled. Viewed from the engine side, the rotational direction of the crank axis is a clockwise direction shown by an arrow "A" in normal. In FIGS. 3, 4A, 4B, 4C, 8A, 8B and 8C, the torsional damper 20 is depicted from the crank axis side and the rotational direction of the crank axis is represented by the clockwise direction which is the same as that in FIG. 2. In the torsional vibration operation of the damper 20 as described in FIGS. 8A, 8B and 8C below in detail, under the elastic force of the coil spring disposed between the paired input members 42 and the output member 46, the rotation fluctuation of the crank axis is reduced by alternately swinging (rotating) the coil spring to the same direction (the clockwise direction) of the rotational direction of the crank axis shown in FIG. 8B (the forward rotation) and swinging (rotating) the coil spring to the opposite direction (the counterclockwise direction) of the rotational direction of the crank axis shown in FIG. 8C (the reverse rotation). In the following description of the detailed configurations of the respective components of the torsional damper 20, the portions related to the forward rotation operation assign "a", and the portions related to the reverse rotation operation assign "b". As shown in FIG. 2, the front plate 52 has an annular shape and forms protruding portions 52-1 which are disposed at an outer circumference to radial outward at an equal interval in the circumferential direction. The rear plate 54 has also an annular shape and forms short protruding portions 54-1 in the axial direction which are disposed at an outer circumference at an equal interval in the circumferential direction. The protruding portions 52-1 of the front plate 52 are fitted to the grooves 54-2 between the protruding portions 54-1 in the axial direction of the rear plate 54, and are welded to the grooves 54-2 (the welded portions are denoted by the reference numeral 56 in FIG. 1). Thereby, the front plate 52 and the rear plate 54 are integrated as the paired input members 42. The front plate 52 forms an integrated cylindrical portion in a center portion which is protruded to the front cover 11. This integrated cylindrical portion becomes an outer clutch drum 28 of the lock up clutch 18. That is, when the front plate 52 is press-formed from the plate steel, the outer clutch drum 28 is also formed. As shown in FIG. 2, in the outer clutch drum 28, concave portions and convex portions are alternately formed in the circumferential direction. The concave portions 28-1 in the inner circumferential surface of the concave portions and the convex portions are meshed with the outer teeth 26-2A of the outer circumferential end of the driven plate 26-2 of the clutch pack 26 in FIG. 1. Thereby, the rotation can be prevented, and the driven plate 26-2 can slide in the axial direction.

Figure 6:
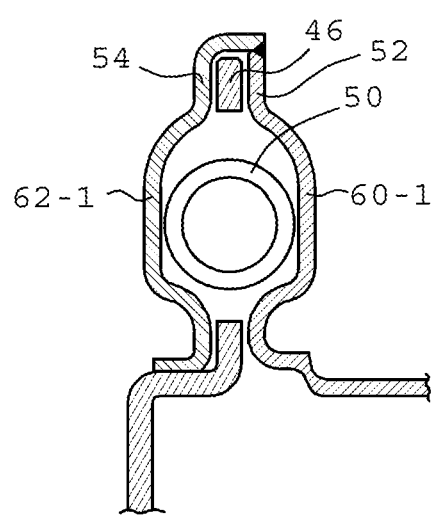
FIG. 6 is a cross-sectional view of the torsional damper, taken along a VI-VI line of FIG. 3.

In FIG. 1, the paired input members 42 comprise the front plate 52 and the rear plate 54. The front plate 52 and the rear plate 54 include formed portions 60 and 62. The output member 46 is sandwiched between the formed portions 60 and 62 which are opposite to the axial direction and protrude to the separating direction each other as a whole. The paired input member side spring receiving portions 44 comprise a pair of the formed portions 60 and 62 which are opposite to the axial direction. As shown in FIG. 2, the eight paired spring receiving portions 44 for receiving the coil springs 50 which comprise a pair of the formed portions 60 and 62 opposite to the axial direction are disposed at an equal interval in the circumferential direction. The configuration of one formed portion 60 of the front plate 52 which constitutes the front side of the paired input member side spring receiving portions 44 will be described. As clearly shown in FIGS. 3, 4A, 4B and 4C, the press-formed portion 60 has a shape that both ends in the circumferential direction of the protruding portion 60-1 which protrudes to the front side are cut. Thus, the window-shape opening 60-2 is formed on the general surface of the radial direction of the front plate 52. The spring pedestals 60-3a and 60-3b which are opposite to the circumferential direction in the window-shape opening 60-2 and are the end portions extended to the radial direction, are formed. As described above, the suffix "a" denotes the relation to the forward rotation operation that the spring pedestal suppresses the torsional vibration by the damper 20, regardless of the forward rotation (the suffix "a" of FIGS. 8A, 8B and 8C) and the reverse rotation (the suffix "b" of FIGS. 8A, 8B and 8C) in the rotation fluctuation. The suffix "b" denotes the relation to the reverse rotation operation. The spring pedestal 60-3a denotes the forward rotation side spring pedestal and the spring pedestal 60-3b denotes the reverse rotation side spring pedestal. The configuration of one formed portion 62 of the rear plate 54 which constitutes the rear side of the paired input member side spring receiving portions 44 will be described. The press-formed portion 62 has a shape that both ends in the circumferential direction of the protruding portion 62-1 which protrudes to the rear side are cut. Thus, the window-shape opening 62-2 is formed on the general surface of the radial direction of the rear plate 54. The forward rotation side spring pedestal 62-3a and the reverse rotation side spring pedestal 62-3b which are opposite to the circumferential direction in the window-shape opening 62-2 and are the end portions extended to the radial direction, are formed. As described above, in the forward rotation and the reverse rotation, since the reference of the torsional direction in the torsional vibration is set to the output member 46, in the paired input members 42, the opposite direction side end portion to the rotation direction of the crank axis is the forward rotation side and the same direction side end portion to the rotation direction of the crank axis is the reverse rotation side. Further, the front plate 52 and the rear plate 54 are integrated by the welding portions 56 (FIG. 1). In the eight pairs of the formed portions 60 and 62, which are opposite to the front plate 52 and the rear plate 54 in the axial direction, the bent portions 60-1 and 62-1, the window-shape openings 60-2 and 62-2, the forward rotation side spring pedestals 60-3a and 62-3a and the reverse rotation side spring pedestals 60-3b and 62-3b, which constitute the paired formed portions 60 and 62, are disposed in alignment with the axial direction. The shape of the protruding portions 60-1 and 62-1 of the formed portions 60 and 62 is also depicted in FIG. 6.

In FIG. 2, the output member 46 is also a press formed product made of plate steel. The eight output member side spring receiving portions 48 are paired with the eight input member side spring receiving portions 44 and are disposed at intervals in the circumferential direction. The output member side spring receiving portions 48 have a substantially rectangular window frame extended to the circumferential direction (see, FIG. 4C). Each the output member side spring receiving portions 48 is extended to the radial direction, and forms the forward rotation side spring pedestal 48a at one end and the reverse rotation side spring pedestal 48b at the other end which are separated in the circumferential direction. The output member 46 forms the cylindrical portion 46-1 extending to the rear direction in the center portion. As shown in FIG. 1, on the end surface 46-1' of the cylindrical portion 46-1 of the output member 46, the output member 46 is engaged to the turbine liner 14 and the hub 22 by the rivets 21. The rivets 21 in FIG. 1 are not attached in FIG. 2, but the through holes 46-1A of the rivets 21 are depicted.

Figure 3:
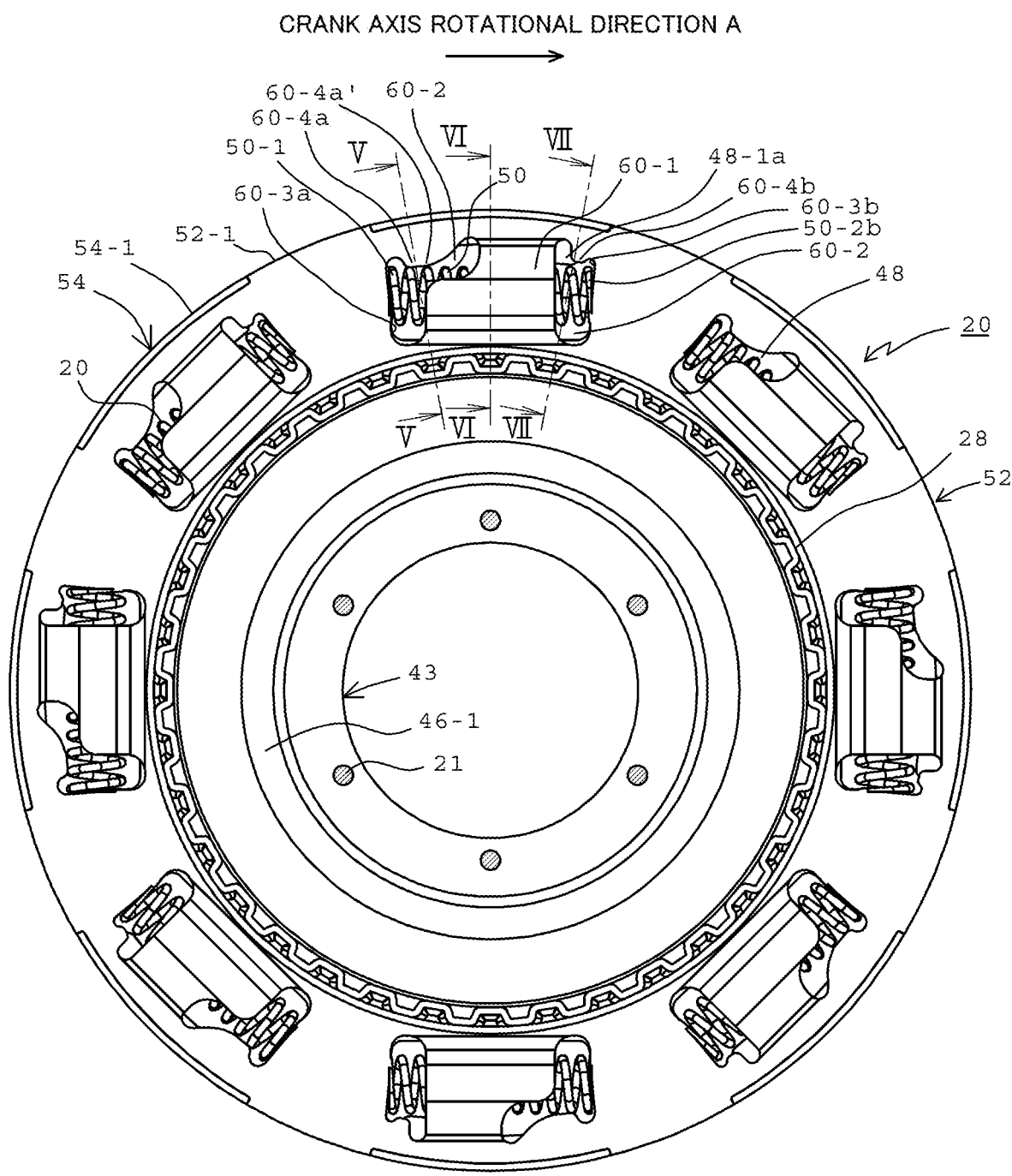
FIG. 3 is a plan view showing a second torsional damper in an assembled state, viewed from the crank axis side.

In FIGS. 2 and 3, the paired input members 42 (the front plate 52 and the rear plate 54), the output member 46 and the coil springs 50 which constitute the torsional damper 20 are shown in a neutral state that the relative rotation between the paired input members 42 and the output member 46 are not existed in the positive direction and the negative direction. Assembling the paired input members 42, the output member 46 and the coil springs 50 into the torsional damper 20 is performed in the neutral state. That is, at first, the coil springs 50 are installed between the spring pedestals 60-3a and 60-3b of the formed portions 60 of the front plate 52 (the front side portion of the spring receiving portion 44) (the coil springs 50 are installed by deflecting under the load which is the predetermined set value). In this state, the coil springs 50 are disposed at the appropriate positions of the corresponding spring receiving portions 48. That is, the end portions of the coil springs 50 are opposite to the spring pedestals 48a and 48b. Next, the coil springs 50 are installed in the rear plate 54 and are positioned at the formed portions 62 of the rear plate 54, that is, the end portions of the coil springs 50 are opposite to the spring pedestals 62-3a and 62-3b. Lastly, the front plate 52 and the rear plate 54 which constitute the paired input members 42 are integrated at the welded portions 56 (FIG. 1), and are assembled as the torsional damper 20. In this assembled state, the bent portions 60-1 and 62-1 of the front plate 52 and the rear plate 54 which constitute the paired input members 42 hold the torsional damper springs 50 in the axial direction.

Figure 4A:
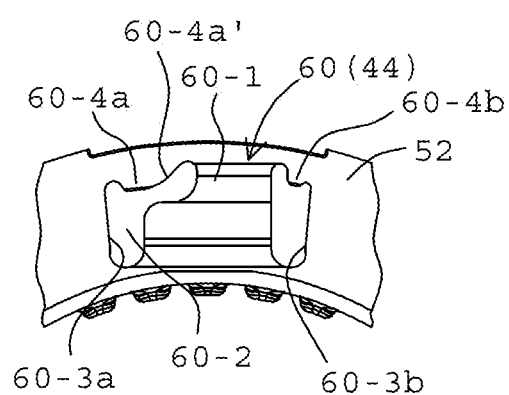
FIG. 4A is a front view showing a front plate formed portion in the torsional damper, viewed from the crank axis side.
Figure 4B:
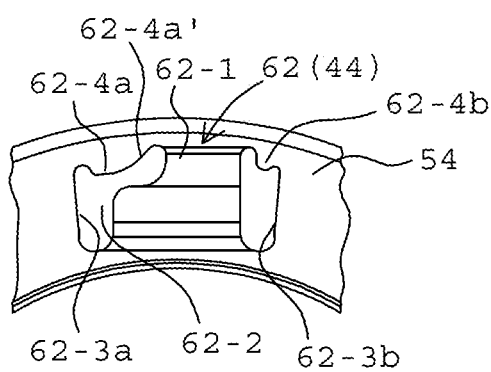
FIG. 4B is a front view showing a rear plate formed portion in the torsional damper (an input member side spring receiving portion comprises the front plate formed portion and the rear plate formed portion), viewed from the crank axis side.
Figure 4C:
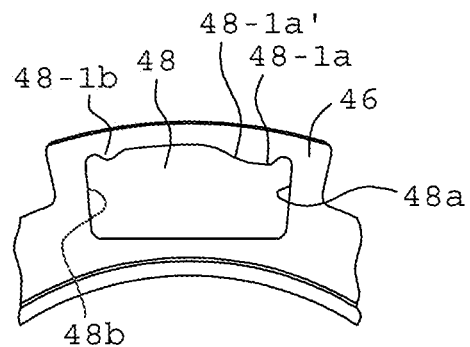
FIG. 4C is a front view showing an output member side spring receiving portion in the torsional damper, viewed from the crank axis side.

Further, the structure of the paired input member side spring receiving portions 44 and the output member side spring receiving portions 48 will be described. The paired input member side spring receiving portions 44 comprise the formed portions 60 of the front plate 52 and the formed portions 62 of the rear plate 54. FIGS. 4A and 4B show the shapes of the formed portions 60 and 62 viewed from the crank axis side (from rightward to leftward in FIG. 2). The bent portion 60-1 for holding the coil spring in the axial direction protrudes to the paper front direction and the bent portion 62-1 protrudes to the paper back direction. Although the bent portion 60-1 and the bent portion 62-1 have the above-described difference, it is understood that the bent portion 60-1 and the bent portion 62-1 have the substantially same shape. The window-shape openings 60-2 and 62-2 of the formed portions 60 and 62 which are positioned on the general surfaces of the front plate 52 and the rear plate 54 in the radial direction also have the substantially same shape. These window-shape openings 60-2 and 62-2 form the forward rotation side spring pedestal 60-3a and 62-3a, and the reverse rotation side spring pedestal 60-3b and 62-3b at both end portions in the circumferential direction. As well, FIG. 4C shows the output member viewed from the crank axis side (from rightward to leftward in FIG. 2). The output member 46 does not comprise the protruding portions in the axial direction like the bent portions 60-1 and 62-1 of the paired input members, but comprises the spring receiving portions 48 formed as the window-shape openings which are positioned on the general surface in the radial direction. These spring receiving portions 48 form the forward rotation side spring pedestal 48a and the reverse rotation side spring pedestal 48b at both end portions in the circumferential direction. The window-shape openings 60-2 and 62-2 of the paired formed portions 60 and 62 of the front plate 52 and the rear plate 54 which constitute the paired input members 42 are always positioned in alignment, regardless of the relative displacement between the paired input portions 42 and the output portion 46. The same is true of the relationship between the forward rotation side spring pedestals 60-3a and 62-3a of the paired formed portions 60 and 62 and the relationship between the reverse rotation side spring pedestals 60-3b and 62-3b. In contrast, with respect to the spring pedestals 48 of the output member 46, in the neutral state that the relative displacement between the paired input members and the output member is not existed, the spring pedestals 48 of the output member 46 aligns with the window-shape openings 60-2 and 62-2 of the paired input members 42. That is, the forward rotation side spring pedestals 48a aligns with the reverse rotation side spring pedestals 60-3b and 62-3b and the reverse rotation side spring pedestals 48b aligns with the forward rotation side spring pedestals 60-3a and 62-3a. When the relative displacement (the torsional vibration) of the output member 46 to the paired input members 42 is occurred, the rotational angle position of the spring pedestals 48 of the output member 46 to the window-shape openings 60-2 and 62-2 of the paired input members 42 is changed, the position of the reverse rotation side spring pedestals 48b to the forward rotation side spring pedestals 60-3a and 62-3a is changed, and the position of the forward rotation side spring pedestals 48a to the reverse rotation side spring pedestals 60-3b and 62-3b is changed. As described below, the function for suppressing the torsional vibration can be obtained by the compression of the coil springs opposite to the paired input members 42 and the output member 46.

Next, with respect to the input member side spring portions 44 and the output member side spring portions 48, when the elastic deformation of the coil springs under the centrifugal force which is generated by the rotation of the paired input members and the output member is occurred, the structure for slidably guiding the coil spring outer circumferential portion will be described. In FIG. 4A, the window-shape openings 60-2 of the formed portions 60 which constitute the front side of the input member side spring receiving portions 44 comprise the forward rotation side guide portion 60-4a as the radial inward protruding portion at the position which is slightly separated from the forward rotation side spring pedestal 60-3a and is near the forward rotation side spring pedestal 60-3a side from the center portion of the circumferential direction of the window-shape opening 60-2 in a circumferential surface to radial outward, and the reverse rotation side guide portion 60-4b as the radial inward protruding portion at the position which is slightly separated from the reverse rotation side spring pedestal 60-3b and is near the reverse rotation side spring pedestal 60-3b from the center portion of the circumferential direction of the window-shape opening 60-2. As well as the description of the spring pedestal, in the guide portions, the suffix "a" denotes that the guide portions function in the forward rotation operation and the suffix "b" denotes that the guide portions function in the reverse rotation operation, regardless of the forward rotation and the reverse rotation in the rotation displacement. In FIG. 4B, the window-shape openings 62-2 of the formed portions 62 which constitute the rear side of the input member side spring receiving portions 44 comprise the forward rotation side guide portion 62-4a as the radial inward protruding portion at the position which is slightly separated from the forward rotation side spring pedestal 62-3a and is near the forward rotation side spring pedestal 62-3a side from the center portion of the circumferential direction of the window-shape opening 62-2 in the circumferential surface to radial outward, and the reverse rotation side guide portion 62-4b as the radial inward protruding portion at the position which is slightly separated from the reverse rotation side spring pedestal 62-3b and is near the reverse rotation side spring pedestal 62-3b from the center portion of the circumferential direction of the window-shape opening 62-2. In FIGS. 4A and 4B, the forward rotation side guide portions 60-4a and 62-4a substantially have the same position of the circumferential direction and the same shape between the front side (the formed portion 60) and the rear side (the formed portion 62) of the integrated input member side spring receiving portions 44 in the assembled state. The reverse rotation side guide portions 60-4b and 62-4b substantially have the same position of the circumferential direction and the same shape. The protrusion heights to the radial inward of the forward rotation side guide portions 60-4a and 62-4a are slight higher than those of the reverse rotation side guide portions 60-4b and 62-4b. The forward rotation side guide portions 60-4a and 62-4a have the inclined surfaces 60-4a' and 62-4a' that the protrusion height to the radial direction becomes gradually lower from the center portion side in the circumferential direction of the corresponding formed portions 60 and 62. Thus, with respect to the length of the circumferential direction, the lengths of the forward rotation side guide portions 60-4a and 62-4a are much longer than those of the reverse rotation side guide portions 60-4b and 62-4b. Since the lengths of the forward rotation side guide portions 60-4a and 62-4a are long in the circumferential direction and the lengths of the reverse rotation side guide portions 60-4b and 62-4b are short, the protruding portions 60-1 and 62-1 are biased to proximal sides of the reverse rotation side spring pedestals 60-3b and 62-3b. The position relationship that the protruding portions 60-1 and 62-1 are biased to the proximal sides of the reverse rotation side spring pedestals can be understood from FIG. 3.

As shown in FIG. 4C, the output member side spring receiving portion 48 which is formed as the window-shape opening comprises the reverse rotation side guide portion 48-1b as the radial inward protruding portion at the position which is slightly separated from the reverse rotation side spring pedestal 48b and is near the reverse rotation side spring pedestal 48-1b side from the center portion of the circumferential direction in the circumferential surface to radial outward, and the forward rotation side guide portion 48-1a as the radial inward protruding portion at the position which is slightly separated from the forward rotation side spring pedestal 48a and is near the forward rotation side spring pedestal 48-1a side from the center portion of the circumferential direction. The protrusion height to radial inward of the reverse rotation side guide portions 48-1b is slightly lower than that of the forward rotation side guide portions 48-1a. With respect to the length of the circumferential direction, the length of the forward rotation side guide portion 48-1a is slightly longer than that of the reverse rotation side guide portion 48-1b. Thus, the forward rotation side guide portions 48-1a have the inclined surface 48-1a' that the protrusion height to the radial direction is gradually lower from the end portion to the center portion of the output member side spring receiving portion 48 in the circumferential direction. As described below, the guide function of the displacement of the coil springs 50 by the centrifugal force is performed by the input member forward rotation side guide portions 60-4a and 62-4a and the output member forward rotation side guide portion 48-1a whose protrusion height to radial inward is high in a case of the forward rotation side torsional vibration, and is performed by the input member reverse rotation side guide portions 60-4b and 62-4b and the output member reverse rotation side guide 48-1b whose protrusion height to radial inward is low in a case of the reverse rotation side torsional vibration. When the rotation changes from the reverse rotation that the guide portions (60-4b, 62-4b and 48-1b) whose radial direction protrusion height is low are used to the forward rotation that the guide portions (60-4a, 62-4a and 48-1a) whose radial direction protrusion height is high are used, the smooth switch from the guide portions whose protrusion height is low to the guide portions whose protrusion height is high can be performed by using the inclined surfaces 60-4a', 62-4a' and 48-1a'.

FIG. 3 is a front view from the front side of the paired input members of the torsional damper 20 in the neutral state that the relative displacement between the input side and the output side is not existed (the amplitude of the torsional vibration is zero) and the non-rotation state (the state that the components are assembled in FIG. 2). In FIG. 3, only the axial direction protruding portions 54-1 in the outer circumference which are engaged with the radial direction protruding portions 52-1 can be seen in the rear plate 54 of the paired input members. With respect to the output member 46, only the forward rotation side guide portions 48-1*a*, the cylindrical portions 46-1 and the rivets 21 can be seen. The overall front plate 52 of the paired input members can be seen. The position relationship among the guide portions 60-4*a* and 60-4*b* in the inner circumferential surface of the window-shape openings 60-2 of the front plate 52 in the circumferential direction and the coil springs 50 can easily be understood. That is, in the neutral state of the torsional damper 20, the forward rotation side guide portions 60-4*a* are positioned opposite to the outer circumference of the coil springs 50 near the second turn of the coil springs 50 which is separated from the forward rotation side spring pedestals 60-3*a* to the reverse rotation side spring pedestals 60-3*b*, and the reverse rotation side guide portions 60-4*b* are positioned opposite to the outer circumference of the coil springs 50 near the second turn of the coil springs 50 which is separated from the reverse rotation side spring pedestals 60-3*b* to the forward rotation side spring pedestals 60-3*a*. With respect to the output member 46, it is understood that the forward rotation side guide portions 48-1*a* are positioned opposite to the outer circumference of the coil springs 50 near the second turn of the coil springs 50 which is separated from the forward rotation side spring pedestals (the reference numeral 48*a* in FIG. 4C) to the reverse rotation side spring pedestals. With respect to the shape of the coil spring opposite surface of the guide portions, since the guide portions of the front plate 52 and the rear plate 54 are positioned at the both ends in the output member 46, the consideration in the above-describe viewpoint is needed. That is, as clearly shown in FIGS. 5 and 7, in the radial direction displacement of the coil springs 50 under the centrifugal force as described below, since the guide portions 60-4*a* and 60-4*b* of the front plate 52 and the guide portions 62-4*a* and 62-4*b* of the rear plate 54 prevent the deflect to the axial direction of the coil springs 50 and enable the smooth sliding of the coil springs 50 in contacting under the centrifugal force of the coil springs 50, the opposite surfaces to the coil springs 50 in the guide portions 60-4*a* and 60-4*b* and the guide portions 62-4*a* and 62-4*b* have the inclined surface with the gradient along the outer circumference of the coil springs 50. Because the output member 46 is positioned on the diameter, the shape of the opposite surface to the coil springs 50 of the disposed guide portions 48-1*a* and 48-1*b* is set to flat.

Figure 5:
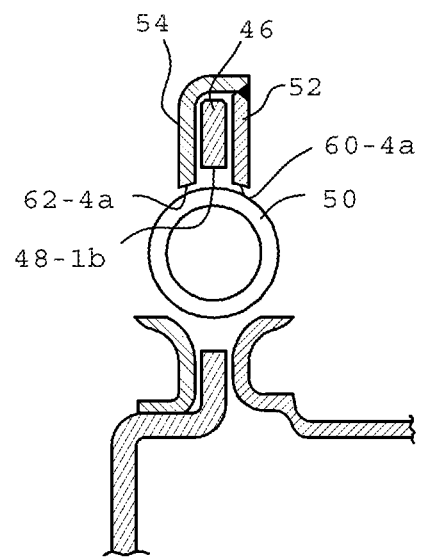
FIG. 5 is a cross-sectional view of the torsional damper, taken along a V-V line of FIG. 3.
Figure 7:
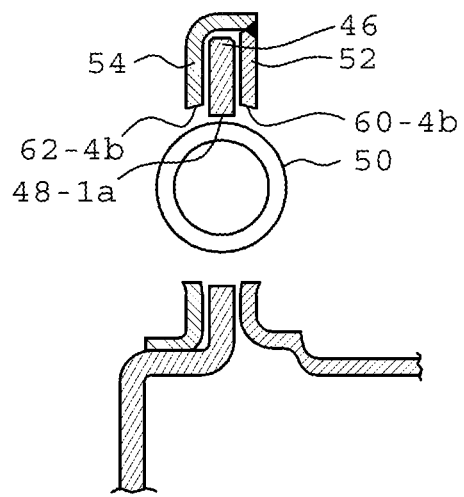
FIG. 7 is a cross-sectional view of the torsional damper, taken along a VII-VII line of FIG. 3.

Since FIGS. 5 and 7 are depicted in the assembled state that the centrifugal force is not applied, the guide portions 60-4*a*, 62-4*a* and 48-1*a* which have the high radial direction protrusion height have the slight clearance to the opposite surface of the coil spring 50.

Preferably, the contact lengths to the coil springs 50 of the paired input member side guide portions 60-4*a*, 60-4*b* and 62-4*a*, 62-4*b* and the output member side guide portions 48-1*a* and 48-1*b* in the coil spring displacement by the centrifugal force are the shortest length to surely suppress the displacement of the coil springs under the centrifugal force. Accordingly, it is enough that the length that one turn of the coil springs is surely supported by the guide portions is existed.

As described above, in the present invention, the guide portions of the coil springs 50 in the inner circumferential surfaces of the respective paired input member side spring receiving portions 44 (the paired formed portions 60 and 62) are two portions (the paired forward rotation side guide portions 60-4*a* and 62-4*a* and the paired reverse rotation side guide portions 60-4*b* and 62-4*b*). The guide portions of the coil springs 50 in the inner circumferential surfaces of the output member side spring receiving portion 48 are two portions in the circumferential direction (the forward rotation side guide portion 48-1*a* and the reverse rotation side guide portion 48-1*b*). The inner circumferential surface of the spring receiving portions does not abut to the outer circumference of the coil springs 50 in the paired input member side spring receiving portions 44, the output member side spring receiving portion 48, and the other portions. In the paired input member side spring receiving portions 44 and the output member side spring receiving portion 48, since the spring pedestals have a margin to the opposite spring end portions in the radial direction, in particular, in the length of the radial outward, the coil springs 50 are received (are slid) by only the forward rotation side guide portions (60-4*a*, 62-4*a* and 48-1*a*) and the reverse rotation side guide portions (60-4*b*, 62-4*b* and 48-1*b*) against the displacement to the radial direction by the centrifugal force of the coil springs 50, and the spring end portions are slidably displaced against the opposite spring pedestals. The above configuration is depicted in the front plate 52 of FIG. 3. The forward rotation side spring pedestals 60-3*a* and the reverse rotation side spring pedestals 60-3*b* have a margin to the outer diameter of the spring end portions 50-1 and 50-2 in the radial outward. As well, the spring pedestals 62-3*a* and 62-3*b* of the rear plate 54 of the other paired input members 42, and the spring pedestals 48*a* and 48*b* of the output member also have a margin. In the operation of the torsional damper according to the present invention as described below, the spring end portions 50-1 and 50-2 are not constrained to the opposite spring pedestals in the radial direction, in particular, in the radial outward. That is, it is enough that the coil springs 50 abut to the spring pedestals in the axial direction, and retainers which are normally disposed at the coil spring end portions are not required.

Figure 8A:
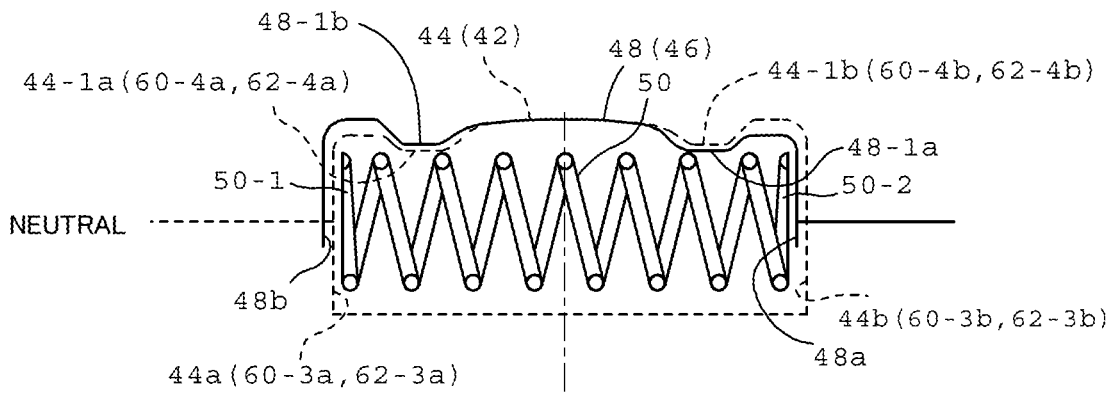
FIGS. 8A, 8B and 8C are a schematic view of an input side spring receiving portion, an output side spring receiving portion and a coil spring for explaining the torsional vibration suppressing operation in the torsional damper of the present invention.
Figure 8B:
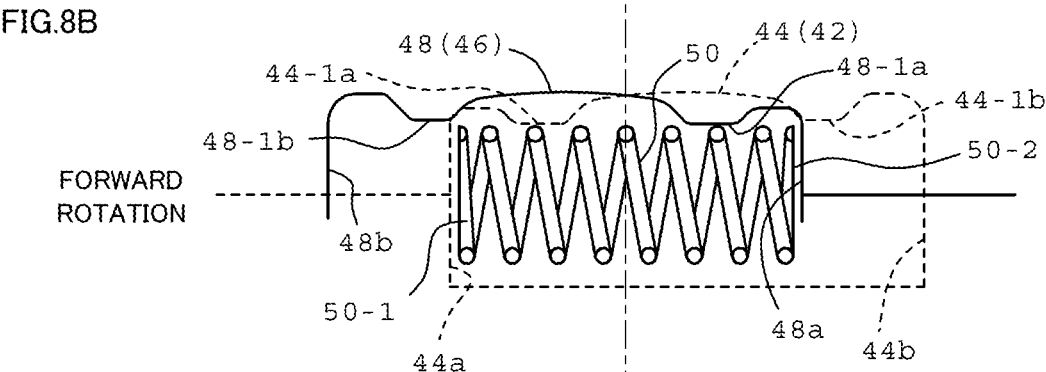
Figure 8C:
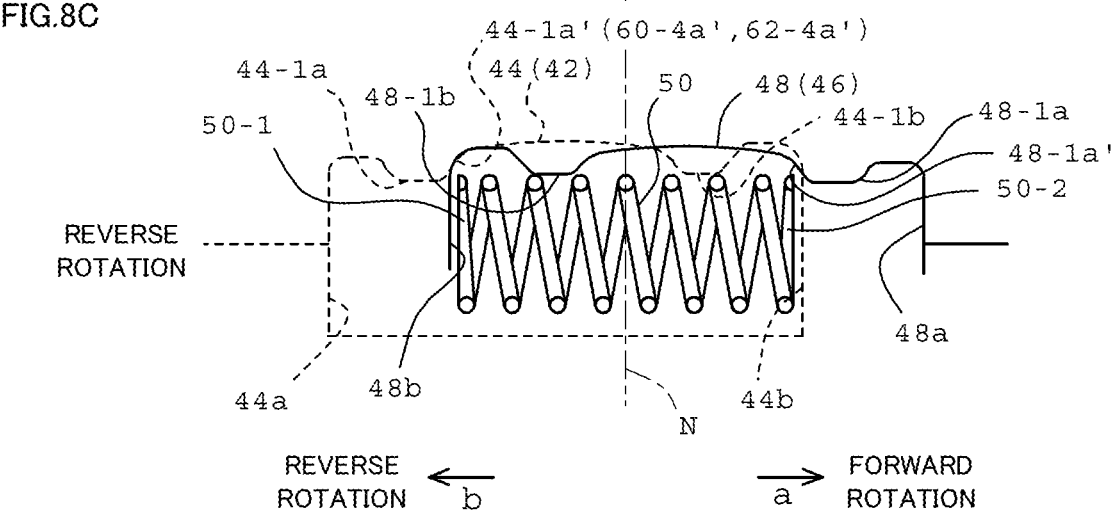

Next, when the lock up clutch 18 is engaged, the guide operation of the urged coil springs 50 to displace to the radial outward under the centrifugal force in the operation of the torsional damper 20 according to the present invention will mainly be described. As described related to FIG. 2 in detail, the plural coil springs 50 disposed in the circumferential direction are received in the respective pairs of the paired spring receiving portions 44 of the input members 42 and the spring receiving portion 48 of the output member 46. FIGS. 8A, 8B and 8C schematically show a pair of the paired input member side spring receiving portions 44 and the output member side spring receiving portion 48. In order to clarify the distinction, the paired input member side spring receiving portions 44 are shown by a broken line and the output member side spring receiving portion 48 is shown by a solid line. The crank axis rotational direction is shown by the arrow "A" (FIG. 3). The neutral line which indicates the neutral state (the torsional torque=0) that the rotation fluctuation between the paired input members 42 and the output member 46 is not existed is shown by the line "N". In the torsional vibration, the relative rotation between the paired input members 42 and the output member 46 is occurred in an advance direction or a delay direction to the crank axis rotation of the neutral state, centered on the neutral state (the crank axis rotates in the "A" direction). FIG. 8B shows the rotation displacement "a" that the paired input members 42 advance in the same direction as the rotational direction "A" (FIG. 3) of the crank axis, and this rotation displacement "a" is defined as the forward rotation. FIG. 8C shows the rotation displacement "b" that the paired input members 42 delay in the opposite direction to the rotational direction "A" (FIG. 3) of the crank axis, and this rotation displacement "b"

is defined as the reverse rotation. In the paired spring receiving portions 44 of FIG. 2, the forward rotation side is represented as 60-3*a* and 62-3*a* and the reverse rotation side is represented as 60-3*b* and 62-3*b*. Since both the paired spring receiving portions 44 integrally move in the assembled state, for simplification, the forward rotation side and the reverse rotation side of the paired input member side spring receiving portions 44 are represented as the forward rotation side pedestal 44*a* and the reverse rotation side pedestal 44*b*, respectively. In the paired guide portions of FIG. 2, the forward rotation side is represented as 60-4*a* and 62-4*a* and the reverse rotation side is represented as 60-4*b* and 62-4*b*. For the same reason, the forward rotation side and the reverse rotation side of the paired guide portions are represented as 44-1*a* and 44-1*b*, respectively. FIG. 8A shows a case that the relative rotation is not existed between the paired input members 42 and the output member 46. In the front plate 52 and the rear plate 54, for the clarification in drawing, the clearance is existed between the spring pedestals 44-1*a* and 48-1*b* and between the spring pedestals 44-1*b* and 48-1*a*. Actually, the spring pedestals 44-1*a* and 48-1*b* are mutually coincident, the spring pedestals 44-1*b* and 48-1*a* are also coincident and in this case, the setting load is applied to the coil spring 50. In the neutral state, the position between the spring pedestals 44-1*a* and 48-1*b* is coincident in the circumferential direction in the guide portions between the paired input members 42 and the output member 46, and the position between the spring pedestals 44-1*b* and 48-1*a* is coincident in the circumferential direction in the guide portions. The centrifugal force occurred in the coil spring 50 under the rotation of the paired input members 42 and the output member 46 urges the coil spring 50 to radial outward. The outer circumferential portion of the coil spring 50 contacts to the forward rotation side guide portion 44-1*a* of the paired input members 42 and the forward rotation side guide portion 48-1*a* of the output member 46 which are the guide portions whose protrusion height to radial inward is high at both the forward rotation side and the reverse rotation side. Thereby, the displacement to radial outward of the coil spring 50 is prevented.

In the forward rotation, as shown in FIG. 8B, the paired input members 42 advance to the output members 46 in the rightward arrow "a" direction. The coil spring 50 is compressed between the forward rotation side pedestal 48*a* of the output member side spring receiving portion 48 and the forward rotation side pedestal 44*a* of the paired input member side spring receiving portions 44. The outer circumferential portion of the coil spring 50 contacts the forward rotation side guide portion 44-1*a* of the paired input member side spring receiving portions 44 and the forward rotation side guide portion 48-1*a* of the output member side spring receiving portion 48 and slides. That is, in the forward rotation, the coil spring 50 under the urge to the radial outward by the centrifugal force is slidably guided by the guide portions 44-1*a* and 48-1*a* whose protrusion height to radial inward is high.

When the amplitude of the forward rotation side torsional vibration arrives at the maximum value, the amplitude of the torsional vibration begins to decrease, and the load applied to the coil spring 50 also decreases. The position relationship is switched to the reverse rotation state shown in FIG. BC via the neutral state shown in FIG. 8A. In this case, the paired input members 42 advance (delay) to the output member 46 in the leftward arrow "b" direction. The coil spring 50 is compressed between the reverse rotation side pedestal 48*b* of the output member side spring receiving portion 48 and the reverse rotation side pedestal 44*b* of the paired input member side spring receiving portions 44. The outer circumferential portion of the coil spring 50 contacts the reverse rotation side guide portion 48-1*b* of the paired output member side spring receiving portions 48 and the forward rotation side guide portion 44-1*b* of the input member side spring receiving portion 44 and slides. Since the protrusion height to radial inward of the guide portion is shapely reduced in this switch from the forward rotation to the reverse rotation, the displacement of the overall coil spring 50 to radial outward is involved. In the reverse rotation side torsional vibration, the coil spring 50 under the urge to the radial outward by the centrifugal force is slidably guided by the guide portions 48-1*b* and 44-1*b* whose protrusion height to radial inward is low.

When the amplitude of the reverse rotation side torsional vibration arrives at the maximum value, the amplitude of the torsional vibration begins to reduce, and the load applied to the coil spring 50 also reduces. The position relationship is switched to the forward rotation state shown in FIG. 8B via the neutral state shown in FIG. 8A. The difference between the guide portions 44-1*a* and 48-1*a* whose protrusion height to radial inward is high and which performs the sliding in the forward rotation and the guide portions 44-1*b* and 48-1*b* whose protrusion height to radial inward is low and which performs the sliding in the reverse rotation is set to the smallest value in a situation that the higher height guide portions and the lower height guide portions are not simultaneously in contact with the coil spring 50.

In the present embodiment, as described in FIGS. 8A, 8B and 8C, the guide in the coil spring 50 to the radial outward displacement by the centrifugal force is performed by the height input side guide portion 44-1*a* (60-4*a* and 62-4*a*) and the height output side guide portion 48-1*a* whose protrusion height to radial inward is high in the forward rotation, and by the height input side guide portion 44-1*b* (60-4*b* and 62-4*b*) and the height output side guide portion 48-1*b* whose protrusion height to radial outward is low in the reverse rotation. Thus, in order to smoothly perform the switch from the reverse rotation that the low guides are used to the forward rotation that the high guides are used, the high height input side guide portions 44-1*a* (60-4*a* and 62-4*a*) and the high height output side guide portion 48-1*a* include the inclined surfaces 44-1*a*' (60-4*a*' and 62-4*a*') and 48-1*a*' whose height is gradually lowered to the circumferential direction center portion side of the respective spring receiving portions (see, FIGS. 4A, 4B and 4C). Thereby, when the reverse rotation that the guide is performed by the low height input side guide portions 44-1*b* (60-4*b* and 62-4*b*) and the low height output side guide portion 48-1*b* is switched to the forward rotation, the coil spring 50 can smoothly be switched to the high height input side guide portions 44-1*a* (60-4*a* and 62-4*a*) and the high height output side guide portion 48-1*a* via the curve surface portions 44-1*a*' (60-4*a*' and 62-4*a*') and 48-1*a*' and the transition from the reverse rotation to the forward rotation can smoothly be performed.

As described above, in this embodiment of the present invention, the guide portions 44-1*a* and 48-1*a* whose radial inward protrusion height is high are used in the forward rotation and the guide portions 44-1*b* and 48-1*b* whose radial inward protrusion height is low are used in the reverse rotation. Accordingly, when switching from the forward rotation to the reverse rotation, the overall coil spring 50 slightly moves to the radial outward. Such a movement can become a factor that the hysteresis torque slightly increases. Since the vehicle mainly drives forward, the torsional vibration in the forward driving mainly uses the forward rotation direction and the guide portions whose radial inward protrusion height is high are used in the forward rotation side torsional vibration, it has an advantage that reducing the bad affected factor of the above-described hysteresis torque for the torsional vibration suppression. However, if the disadvantage for increasing the hysteresis torque is permitted, using the guide portions whose radial inward protrusion height is low in the forward rotation side and the guide portions whose radial inward protrusion height is high in the reverse rotation side does not depart from the scope of the present invention.

FIG. 9A schematically shows a relationship between the fluctuation torque value of the output side (the output axis side torque value in the fluctuation torque—the input axis side torque value in the fluctuation torque) and the torsional angle θ (the rotational angle difference between the output member 46 and the paired input members 42 in the torsional vibration) in the torsional damper 20 of the present invention as described in FIGS. 8A, 8B and 8C. In the ideal torque fluctuation reduction, the relationship between the torsional angle θ and the torsional torque is represented by the line passing the origin (the neutral position of FIG. 8A) which is shown by a dashed dotted line "R". Because the deformation of the coil spring 50 to the torque fluctuation of the input axis has the unavoidable delay in both the contraction direction and the extension direction, the output follows-up the input with a delay. Thus, the relationship between the torsional angle θ and the torsional torque has a hysteresis characteristic shown by a solid line. At one torsional angle, for example, $θ_1$, the torque value difference between the increasing direction and the decreasing direction is defined as the hysteresis torque $TH_1$. The operation that the displacement to radial outward by the centrifugal force of the coil springs 50 is suppressed at the height input side guide portions 44-1a (60-4a and 62-4a) and 44-1b (60-4b and 62-4b) and the height output side guide portions 48-1a and 48-1b generates sliding resistance. Since the sliding resistance is added to the following-up delay of the above deformation of the coil springs 50 when the torque fluctuation due to the displacement of the coil springs 50 is suppressed, the hysteresis torque value becomes larger. However, the present invention has an advantage to the prior art with respect to the above point.

Figure 10A:
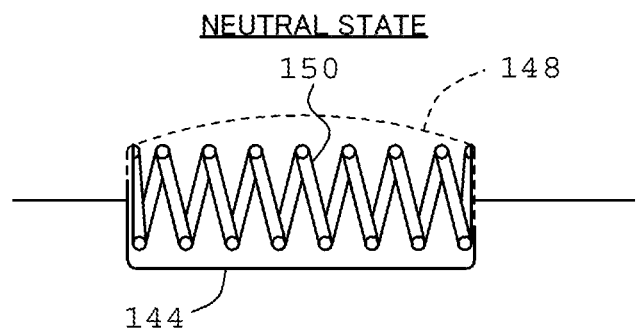
FIGS. 10A, 10B and 10C are a schematic view of the input side spring receiving portion, the output side spring receiving portion and the coil spring for explaining the torsional vibration suppressing operation in the torsional damper of the prior art which does not have a countermeasure to the radial direction displacement.
Figure 10B:
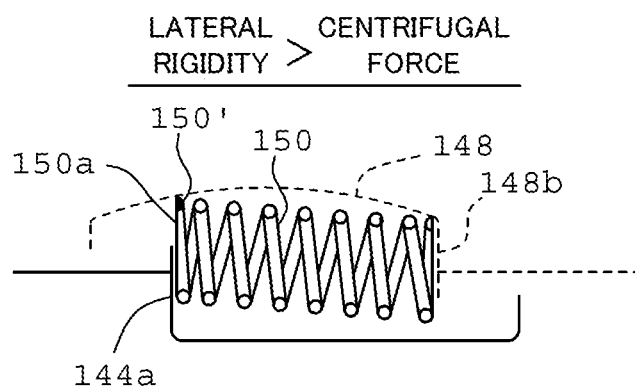

Comparing the present invention with the prior art which is explained at the beginning of the present description, the advantage in the effects of the configuration of the present invention will be described. FIG. 10A schematically shows the normal torsional damper which does not have an ingenious mechanism with respect to the suppression of the radial direction displacement of the coil springs under the centrifugal force. The positive direction and the negative direction of the relative deformation are the same as those of FIGS. 8A, 8B and 8C of the example according to the present invention. Here, the reference numeral 144 denotes the input side coil spring receiving portion and the reference numeral 148 denotes the output side coil spring receiving portion. Considering the rotational displacement that the input member advances the forward rotation side to the output member (the right side of FIG. 10A) (the explanation of the reverse rotation side is omitted, but the same result is obtained), as shown in FIG. 10B, the coil spring 150 deforms between the forward rotation side spring pedestal 148a of the output side coil spring receiving portion 148 and the forward rotation side spring pedestal 144a of the input side coil spring receiving portion 144. In a case that the lateral rigidity of the coil spring 150 is large enough to overcome the centrifugal force, the coil spring 150 does not deflect, the coil spring input member side end portion 150a largely displaces to the radial outward, abuts to and slides to the inner circumferential surface of the output side coil spring receiving portion 148, and is in contact with an inscribed surface of the output side coil spring receiving portion 148 where the rotational direction displacement of the coil spring input member side end portion 150a is maximized (shown by the black region 150') by the centrifugal force. As shown in FIG. 9B, the larger hysteresis torque than $TH_1$ is generated at the same torsional angle $θ_1$.

Figure 10C:
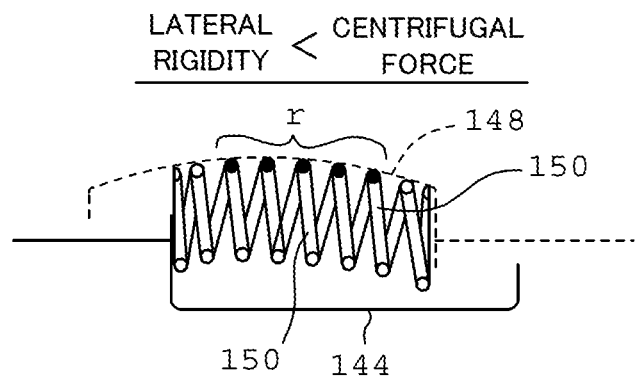
Figure 11A:
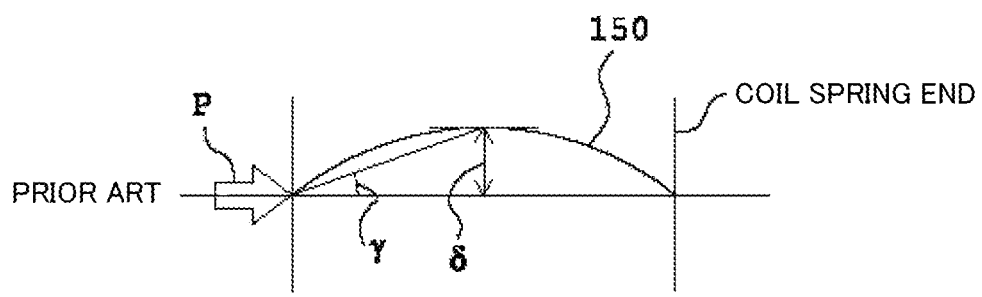
FIGS. 11A and 11B are a schematic view showing the displacement to radial outward of the coil spring in the spring receiving portions when occurring the torsional vibration under the centrifugal force.
Figure 11B:
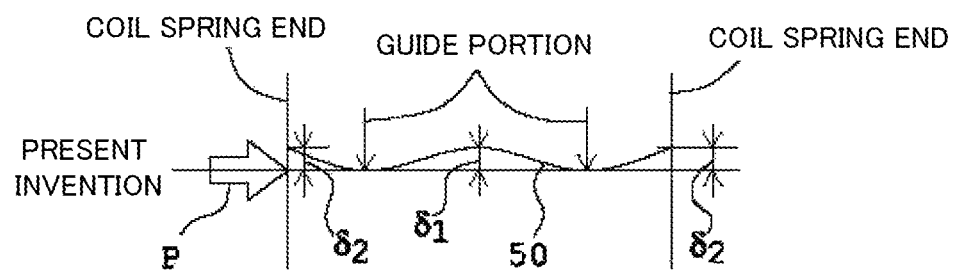

In a case that the long coil spring 150 having a small diameter is disposed at the outer circumferential side due to the restriction of the layout and the like, as shown in FIG. 9C, the coil spring 150 deflects because of lacking the lateral rigidity, and the sliding by being in contact with the coil spring 150 and the opposite surface is occurred (the contact portion of the coil spring 150 is schematically shown by the black region along the perimeter "r"). In this time, the magnitude of the deflection of the coil spring 150 is schematically shown in FIG. 11A. Since the large deflection δ is occurred in the center portion against the compression load "P" added to the both ends of the coil spring 150 by the relative displacement between the input axis and the output axis, the large compression load vertical component force depending on the angle γ in FIG. 11A is occurred, and the coil spring 150 contacts to and slides to the opposite surface, the additive sliding portions are occurred and the larger hysteresis torque $TH_1'$ shown in FIG. 9B is generated at the same torsional angle $θ_1$. In contrast, since the end portions 50-1 and 50-2 of the coil spring 50 do not abut to the radial direction opposite inner surfaces of the spring receiving portions 44 and 48 in the relative displacement between the input axis and the output axis in the present invention (in FIGS. 8B and 8C), the sliding to the coil spring receiving portion inner surface of the coil spring 150 end portions of such a conventional structure (in FIGS. 10B and 10C) is not occurred. As described in FIGS. 8B and 8C, since the two guide portions 44-1a and 48-1a in the circumferential direction in the forward rotation and the two guide portions 48-1b and 44-1b in the circumferential direction in the reverse rotation are guided to the displacement of the coil spring 50 under the centrifugal force in the present invention, and the vertical component force of the compression load of the coil spring 50 in the sliding to the opposite surfaces of the coil spring receiving portions 44 and 48 when deforming the coil spring 50 is almost zero, the increase amount of the hysteresis torque due to the spring compression load can be suppressed. That is, as shown in FIG. 11B, the deflection of the coil spring 50 is $δ_1$ at the center portion and is $δ_2$ at the both ends, the deflection along the total length of the coil spring 50 in the circumferential direction is suppressed to the small value, the buckling of the coil spring 50 is prevented, it is ensured that the deflection has almost a zero value at the guide portions 44-1a and 48-1a in the forward rotation and at the guide portions 48-1b and 44-1b in the reverse rotation, and the generation of the large hysteresis torque which is explained in the prior art of FIG. 10C can also be prevented.

Figure 12A:
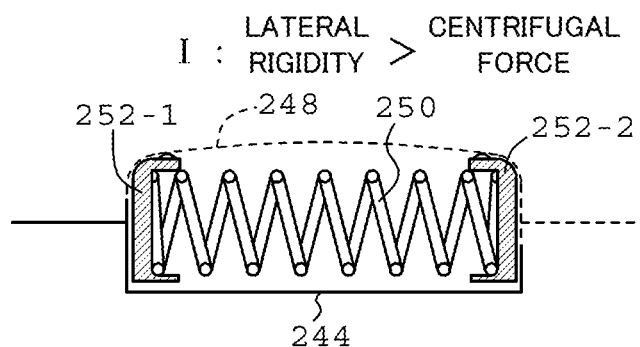
FIGS. 12A, 12B, 12C and 12D are a diagram explaining the torsional vibration suppressing operation in the prior art (Patent Document 1) which has a countermeasure for sliding when constraining the spring end portions.
Figure 12B:
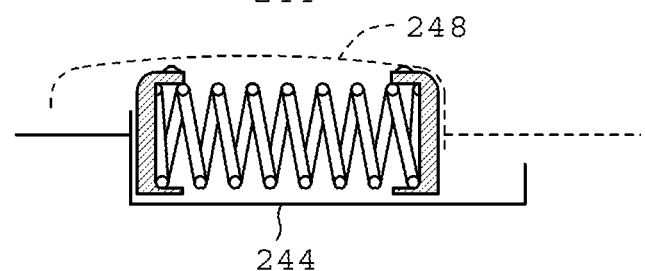
Figure 12C:
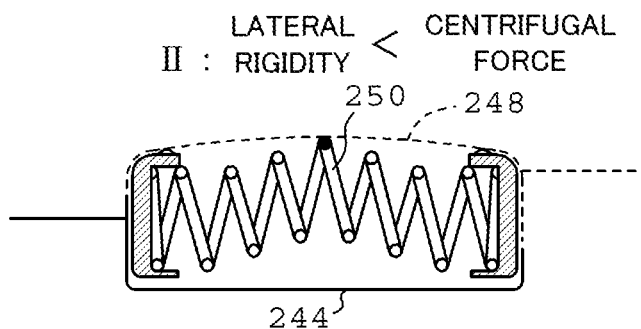
Figure 12D:
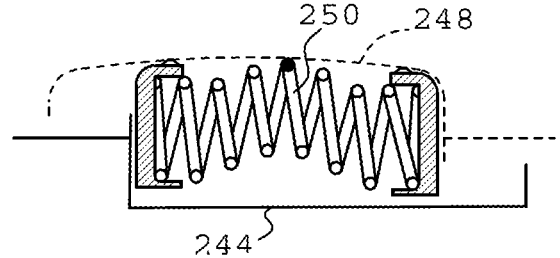

Comparing present invention with Patent Document 1 as the prior art, as shown in FIGS. 12A, 12B, 12C and 12D, in Patent Document 1, the both ends of the coil spring 250 which is received in the spring receiving portions 244 and 248 are constrained by the spring sheets 252-1 and 252-2. Even in a case "I" in FIGS. 12A and 12B that the relative displacement from the neutral state in FIG. 12A to the state in FIG. 12B is occurred (a case of the forward rotation), since the sliding is not occurred, the hysteresis torque due to the sliding has almost a zero value. In a case that the coil spring 250 whose coil diameter is small and whose length is long is received in the large-diameter portion, the bending rigidity of the coil spring 250 is smaller than the centrifugal force occurred in the coil spring 250, as shown in a case "II" in FIGS. 12C and 12D, the coil spring 250 deflects at the center portion under the influence of the centrifugal force and is in contact with the opposite surface of the spring receiving portion 248 (shown by a black circle in FIGS. 12C and 12D). The sliding due to the relative displacement from the neutral state in FIG. 12C to the state in FIG. 12D occurs at the central portion of the coil spring 250 where the deflection is large, and the large hysteresis torque is generated, as shown in FIG. 9B in a case that FIG. 10C is explained in relation to FIG. 11A. In the present invention, since the sliding is occurred at the small deflection portions in the guide portions 48-1$a$ and 44-1$a$ (in FIG. 8B) and the guide portions 44-1$b$ and 48-1$b$ (in FIG. 8C), the hysteresis torque in the present invention can be suppressed to be a smaller value than that in the case of Patent Document 1 that the hysteresis torque becomes large in FIG. 12D.

Figure 13A:
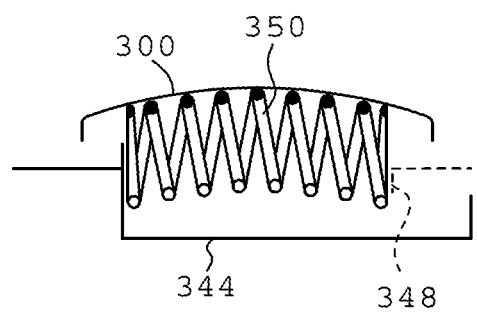
FIGS. 13A and 13B are a diagram explaining the torsional vibration suppressing operation in Patent Document 2 which has an annular member for holding the coil spring.
Figure 13B:
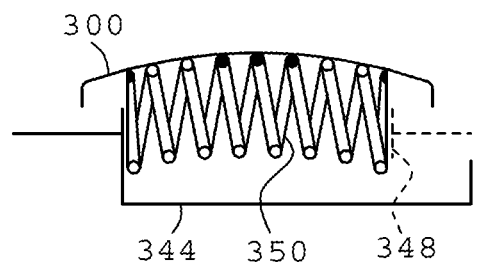

Comparing the present invention with Patent Document 2 as the prior art, as shown in FIGS. 13A and 13B, in Patent Document 2, the outer circumference of the coil spring 350 is contacted to the annular member 300 which does not contribute to the torque transmission of the input axis and the output axis. Even when the compression of the coil spring 350 between the input side spring receiving section 344 and the output side spring receiving section 348 due to the relative displacement between the input axis and the output axis is occurred, only the annular member 300 rotates and the sliding between the coil spring 350 and the opposite surface of the annular member 300 is not occurred. In this case, it is necessary that the annular member 300 rotates in response to the deformation of the coil spring 350. In order to realize the above rotation in the annular member 300, it is required that the spring length of the coil spring 350 is short and the lateral rigidity of the coil spring 350 is low so as to ensure the uniform contact with the inner circumference of the annular member 300 along the total length of the coil spring 350. FIG. 13A schematically shows a state that the coil spring 350 uniformly is in contact with the annular member 300 along the total length, as shown by the black circles. However, in a case of the long coil spring 350, the coil spring 350 cannot uniformly be in contact with the inner circumferential surface of the annular member 300. FIG. 13B schematically shows a state that the coil spring 350 locally and non-uniformly is in contact with the annular member 300. As a result, because the annular member 300 cannot smoothly rotate in response to the deformation of the coil spring 350, the concern for not obtaining the expected performance is existed. Further, it is desired that the annular member 300 is as light as possible. However, the weight reduction leads to the strength reduction and the concern for the abnormal expansion-contraction operation of the coil spring 350 due to the deformation, and the deformation or the breakage of the annular member 300 is existed. The present invention does not need to use the annular member 300, and can suppress the hysteresis torque without the restriction for the installation of the coil spring.

Figure 14:
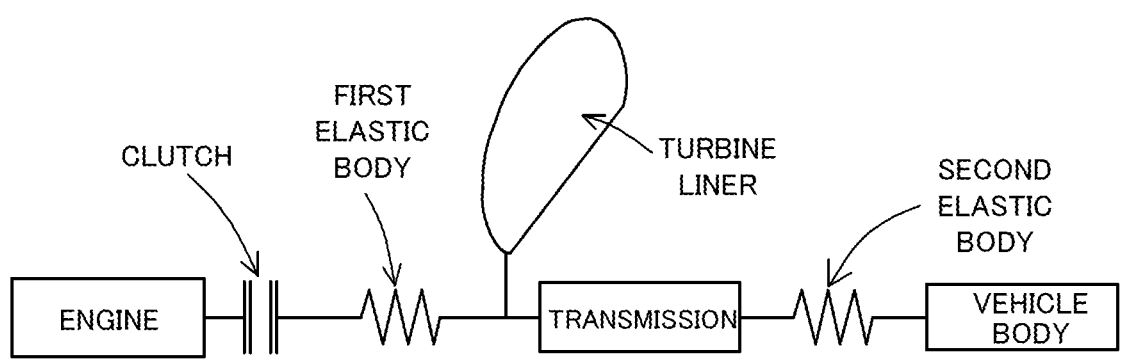
FIG. 14 is a schematic view showing a torque flow in a power transmission system from an engine to a transmission which has the torsional damper used in the embodiment of the present invention shown in FIG. 1 to FIGS. 8A, 8B and 8C.

In the configuration of FIG. 1 which is the embodiment of the present invention, the engagement of the lock up clutch 18 is performed by the operation hydraulic pressure which is introduced to the hydraulic pressure chamber 39. In this time, the piston 32 is displaced rightward against the return spring 36, the clutch pack 26 is sandwiched between the piston 32 and the receiving pressure portion 11-1 of the front cover 11, and the driving plate 26-1 of the lock up clutch 18 is engaged with the driven plate 26-2 via the clutch facing 26-3. The inner side clutch drum 30 integrated with the front cover 11 integrally rotates with the outer side clutch drum 28, and then the paired input members 42 (the front plate 52 and the rear plate 54) of the torsional damper 20 integrally rotate with the front cover 11. The rotation of the paired input members 42 is transmitted to the output member 46 via the coil spring 50, is rotated with (is idled with) the turbine liner 14, and is transmitted to the input axis of the transmission (not shown) which is spline-fitted to the hub 22 via the hub 22. FIG. 14 schematically shows a torque flow from the driving force source to the vehicle body in the driving force transmission system of the present embodiment when such a lock up clutch is engaged. The rotational torque from the driving force source is transmitted to the transmission via the lock up clutch and the first elastic body (eight springs 50 disposed in a circumferential direction in the present embodiment), and then the above torque is transmitted to the vehicle body via the transmission and the second elastic body (the torsional elasticity of the driving shaft from the transmission to the vehicle body). By using such a torque flow, the modeling of the torque transmission system of the present embodiment for the vibration calculation shown in FIG. 15 can be done. This vibration calculation model is configured as the two-degree-of-freedom torsional vibration model that the engine side rotational mass portion 80 which comprises the engine which includes the front cover 11 from the crank axis of the engine (the internal combustion engine), the pilot 38, the clutch pack 26, the outer side drum 28, the inner side drum 30, the piston 32, the separator plate 34, the paired input members 42 and the like, is connected to the transmission side rotational mass portion 84 which comprises the output member 46, the hub 22, the turbine liner 14 and the transmission (not shown) by the torsional rigidity portion 82 which comprises eight coil springs 50, and the transmission side rotational mass portion 84 is connected to the vehicle body via the torsional rigidity portion 86 which comprises the vehicle driving shaft. In the vibration calculation model in FIG. 15, the reference numerals are represented as follows.

$I_1$: inertia moment of the engine side rotational mass portion 80

$I_2$: inertia moment of the transmission side rotational mass portion 84

$K_1$: torsional rigidity of the torsional rigidity portion 82 (the coil spring 50)

$K_2$: torsional rigidity of the torsional rigidity portion 86 (the vehicle driving shaft)

$C_1$: attenuation coefficient of the torsional rigidity portion 82

$T_1$: torque fluctuation (a period ω)) inputted from the enaine side $TH_1$: hysteresis torque $\theta_1$: rotational displacement of the enaine side rotational mass portion 80

$\theta_2$: rotational displacement of the transmission side rotational mass portion 84

Figure 15:
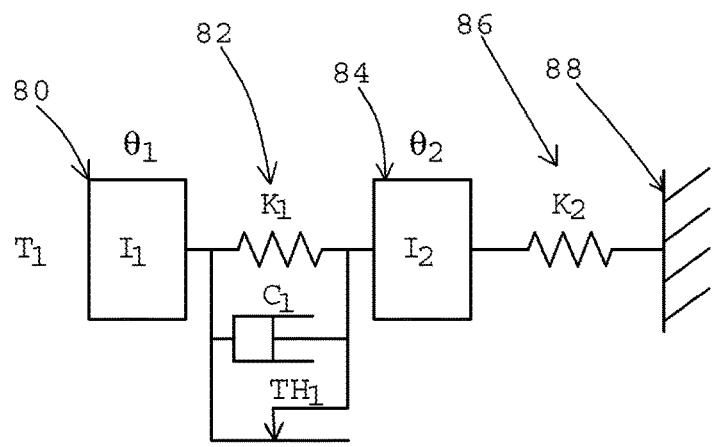
FIG. 15 is a diagram showing a model for calculating a transmission rate to an output side of the input side rotation fluctuation in the torque transmission system shown in FIG. 14.

In the vibration calculation model of FIG. 15, following motion equations are established.

$$I_1\left(\frac{d^2\theta_1}{dt^2}\right) + C_1\left(\frac{d\theta_1}{dt} - \frac{d\theta_2}{dt}\right) + \\ K_1(\theta_1 - \theta_2) + TH_1 \times \text{Sign}\left(\frac{d\theta_1}{dt} - \frac{d\theta_2}{dt}\right) = T_1 \times \sin\omega t \quad (1)$$

-continued $$I_2\left(\frac{d^2\theta_2}{dt^2}\right) + C_1\left(\frac{d\theta_2}{dt} - \frac{d\theta_1}{dt}\right) + K_2(\theta_2 - \theta_1) + TH_1 \times \text{Sign}\left(\frac{d\theta_2}{dt} - \frac{d\theta_1}{dt}\right) = 0 \quad (2)$$

Here, "Sign" is a signum function, and "Sign" returns "1" when the function value in the parenthesis is positive, returns "−1" when function value in the parenthesis is negative and returns "0" when the function value in the parenthesis is zero.

Figure 16:
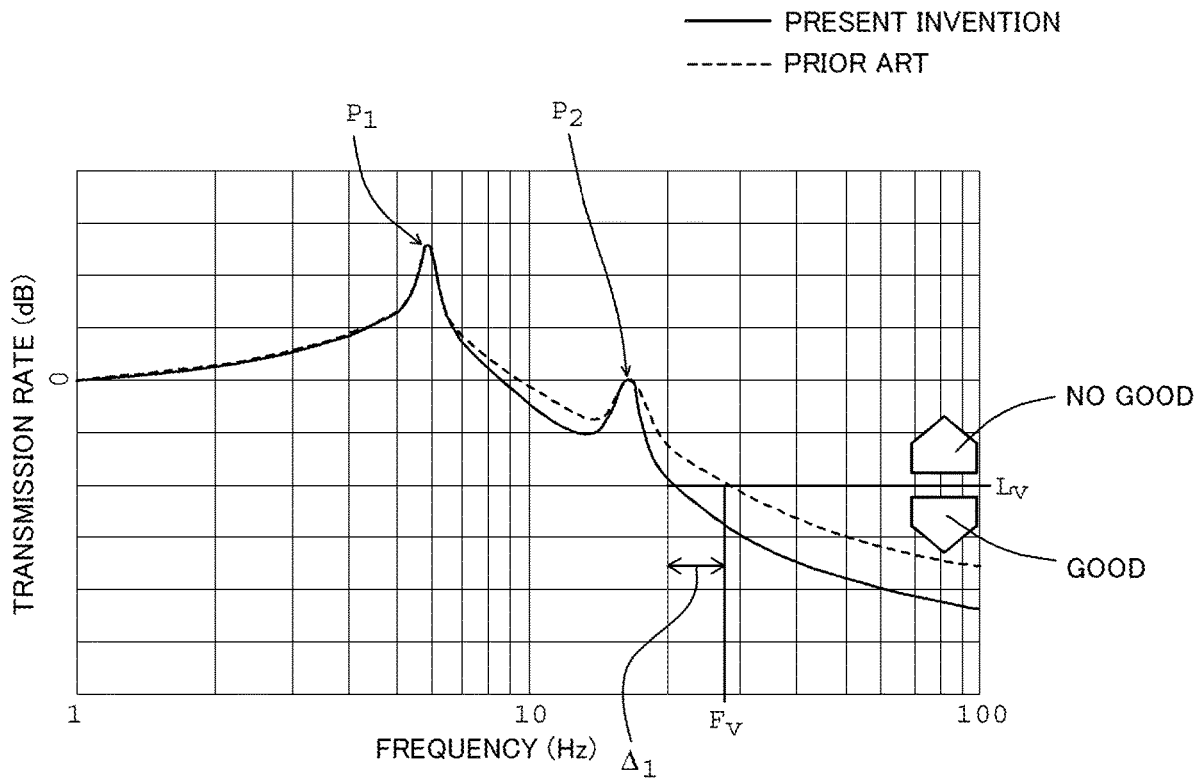
FIG. 16 is a schematic graph showing a frequency characteristic of the torque fluctuation transmission rate in the torsional damper of the present invention, compared with the prior art.

The numerical calculation is performed by using the above motion equations (1) and (2). The calculation results of the transmission rate of the torque fluctuation are shown in FIG. 16. In FIG. 16, the horizontal axis represents the frequency (Hz) and the vertical axis represents the transmission rate of the torque fluctuation. The result of the present invention is shown by a solid line and the result of the prior art is shown by a broken line. In both the torsional damper of the present invention and the torsional damper of the prior art, the transmission rate of the torque fluctuation has the first resonance peak $P_1$ near 6 [Hz], decreases when the frequency increases, has the second resonance peak $P_2$ near 11 [Hz] and monotonically decreases after the second resonance peak $P_2$. As the upper limit of the permissible transmission rate that the noise becomes the problem, the request that the transmission rate is less than $L_v$ which is roughly −20 [dB] at the frequency $F_v$ which is slightly lower than 20 [Hz] is existed. The characteristic of the prior art (the broken line) barely satisfies the above criteria. The characteristic of the present invention (the solid line) has a margin $\Delta_1$ in the frequency against the permissible upper limit $L_v$ of the torque transmission. This means that the noise problem is not existed even when the rotational number is reduced depending on this margin $\Delta_1$ when the lock up clutch is engaged. Therefore, it is understood that the structure of the present invention has an advantage to that of the prior art.

EXPLANATION OF REFERENCE NUMERALS s 10 impeller shell
11 front cover
12 pump impeller
14 turbine liner
16 stator
18 lock up clutch
20 torsional damper (torsional vibration reduction apparatus)
26 clutch pack
28 outer side clutch drum
30 inner side clutch drum
32 annular piston
34 annular separator plate
36 return spring
38 pilot
39 annular hydraulic pressure chamber
42 input member
44 input member side spring receiving portion
   44a input member forward rotation side spring pedestal
   44b input member reverse rotation side spring pedestal
   44-1a forward rotation side guide portion of input member side spring receiving portion
   44-1b reverse rotation side guide portion of input member side spring receiving portion
   44-1a' inclined surface of forward rotation side guide portion of input member side spring receiving portion
46 output member
48 output member side spring receiving portion
   48a output member forward rotation side spring pedestal
   48b output member reverse rotation side spring pedestal
   48-1a forward rotation side guide portion of output member side spring receiving portion
   48-1b reverse rotation side guide portion of output member side spring receiving portion
   48-1a' inclined surface of forward rotation side guide portion of output member side spring receiving portion
50 coil spring
52 front plate of input member
54 rear plate of output member (a pair of annular plate members of the present invention comprise a front plate and a rear plate)
60; 62 formed portion forming input member side spring side receiving portion
   60-1; 62-1 protruding portion
   60-2; 62-2 window-shape opening
   60-3a; 62-3a forward rotation side spring pedestal of formed portion
   60-3b; 62-3b reverse rotation side spring pedestal of formed portion
   60-4a; 62-4a forward rotation side guide portion of formed portion
   60-4b; 62-4b reverse rotation side guide portion of formed portion
   60-4a'; 62-4a' inclined surface of forward rotation side guide portion in formed portion

The invention claimed is:

1. A torsional vibration reduction apparatus, comprising:
an input member of a rotation driving source side;
an output member of a driven body side;
input member side spring receiving portions which are plurally disposed on said input member at intervals in a circumferential direction, each including a spring pedestal opposite to said circumferential direction from each other;
output member side spring receiving portions which are plurally disposed on said output member at intervals in said circumferential direction and are paired with said respective input member side spring receiving portions opposite to an axial direction, each including a spring pedestal opposite to said circumferential direction from each other; and
coil springs which are disposed between respective pairs of said input member side spring receiving portions and said output member side spring receiving portions which are opposite to said axial direction,
wherein, with respect to a rotation displacement that rotation of said output member to that of said input member is same as rotational direction of said rotation driving source (forward rotation), elastic deformation of said coil springs between said forward rotation side spring pedestals of said output member and said forward rotation side spring pedestals of said input member is occurred;
wherein, with respect to a rotation displacement that said rotation of said output member to that of said input member is opposite to said rotational direction of said rotation driving source (reverse rotation), elastic deformation of said coil springs between said reverse rotation side spring pedestals of said output member and said reverse rotation side spring pedestals of said input member is occurred;
wherein said rotation displacement is reduced by said elastic deformation of said coil springs; and
wherein respective pairs of said input member side spring receiving portions and said output member side spring receiving portions comprise a pair of guide portions to permit a local contact to said respective coil springs between circumferential direction center portions of said input member side and said output member side in an inner circumferential surface opposite to an outer circumference of said coil spring and said spring pedestals of said input member side and said output member side for slidably guiding coil spring outer circumferential portions when occurring said elastic deformation of said coil springs under centrifugal force;

wherein, in respective pairs of said input member side spring receiving portions and said output member side spring receiving portions, one of a pair of said guide portions which are disposed at said forward rotation side and said reverse rotation side in one of said input member side spring receiving portion and said output member side spring receiving portion makes protrusion heights to radial inward set to high, one of a pair of said guide portions which are disposed at said forward rotation side and said reverse rotation side in the other of said input member side spring receiving portion and said output member side spring receiving portion makes protrusion heights to radial inward set to low, the other of a pair of said guide portions in the other of said input member side spring receiving portion and said output member side spring receiving portion makes protrusion heights to radial inward set to low, the other of a pair of said guide portions in the other of said input member side spring receiving portion and said output member side spring receiving portion makes protrusion heights to radial inward set to high; and wherein, in rotation fluctuation of one of said forward rotation and said reverse rotation, sliding guide to said centrifugal force in respective pairs of said input member side spring receiving portions and said output member side spring receiving portions is performed by said input member side spring receiving portions and said output member side spring receiving portions whose protrusion heights are high, and in rotation fluctuation of the other of said forward rotation and said reverse rotation, sliding guide to said centrifugal force in respective pairs of said input member side spring receiving portions and said output member side spring receiving portions is performed by said input member side spring receiving portions and said output member side spring receiving portions whose protrusion heights are low.

2. The torsional vibration reduction apparatus according to claim 1,
wherein, in a pair of said guide portions in respective pairs of said input member side spring receiving portions and said output member side spring receiving portions, said guide portion whose protrusion height to radial inward is high has an inclined surface whose protrusion height smoothly decreases toward said center portion in said circumferential direction of said corresponding spring receiving portions.

3. The torsional vibration reduction apparatus according to claim 2,
wherein, in respective pairs of said input member side spring receiving portions and said output member side spring receiving portions, said guide portions whose protrusion height to radial inward is high are said forward rotation side guide portions of said input member side and said forward rotation side guide portions of said output member side, and said guide portions whose protrusion height to radial inward is low are said reverse rotation side guide portions of said input member side and said reverse rotation side portions of said output member side.

4. The torsional vibration reduction apparatus according to claim 1,
wherein, in respective pairs of said input member side spring receiving portions and said output member side spring receiving portions, said guide portions whose protrusion height to radial inward is high are said forward rotation side guide portions of said input member side and said forward rotation side guide portions of said output member side, and said guide portions whose protrusion height to radial inward is low are said reverse rotation side guide portions of said input member side and said reverse rotation side portions of said output member side.

5. The torsional vibration reduction apparatus according to claim 1,
wherein, when occurring torsional fluctuation, said respective pairs of said spring pedestals in said respective pairs of said input member side spring receiving portions and said output member side spring receiving portions freely permit said sliding to a radial direction in said opposite coil spring end portions.

6. The torsional vibration reduction apparatus according to claim 1,
wherein said input member comprises a pair of annular plate members which are integrally coupled, said output member is sandwiched between said paired annular plate members, each of said input member side spring receiving portions is aligned to and is opposite to said paired annular plate members in said axial direction, and is configured as a pair of formed portions having a protruding portion which is extended to an opposite direction, and said opposite end portions aligned to said axial portion in said circumferential direction of window-shape openings which are formed on said general surface in respective pairs of said formed portions and are aligned to said axial direction constitute said spring pedestals of said input member.

7. The torsional vibration reduction apparatus according to claim 6,
wherein said guide portions in said respective paired annular plate members have an inner circumferential surface shape having a gradient along a curved surface of said coil spring outer diameter in a traverse surface of a diameter surface.

* * * * *